US012219682B2

(12) United States Patent
Jeong et al.

(10) Patent No.: US 12,219,682 B2
(45) Date of Patent: Feb. 4, 2025

(54) COOKING APPARATUS

(71) Applicant: Samsung Electronics Co., Ltd., Suwon-si (KR)

(72) Inventors: Jiho Jeong, Suwon-si (KR); Eonjoong Kim, Suwon-si (KR); Taehun Kim, Suwon-si (KR); Inki Jeon, Suwon-si (KR); Seunggee Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 17/150,946

(22) Filed: Jan. 15, 2021

(65) Prior Publication Data

US 2021/0227649 A1 Jul. 22, 2021

(30) Foreign Application Priority Data

Jan. 17, 2020 (KR) ........................ 10-2020-0006791

(51) Int. Cl.
*H05B 6/64* (2006.01)
*F24C 7/02* (2006.01)

(52) U.S. Cl.
CPC ............. *H05B 6/6408* (2013.01); *F24C 7/02* (2013.01); *H05B 6/6494* (2013.01)

(58) Field of Classification Search
CPC .... F04D 25/06; F04D 25/0693; F04D 25/088; F04D 29/601; F04D 29/002; F04D 25/08;
(Continued)

(56) References Cited

U.S. PATENT DOCUMENTS 4,663,506 A * 5/1987 Bowen .................. A47J 36/027 426/243
6,608,292 B1 * 8/2003 Barnes ................. A47J 37/0611 99/425

(Continued)

FOREIGN PATENT DOCUMENTS

CA 2951481 C * 9/2018 ............... A23L 5/34
EP 1732359 A2 12/2006

(Continued)

OTHER PUBLICATIONS

International Search Report dated May 12, 2021 in connection with International Patent Application No. PCT/KR2021/000626, 3 pages.

(Continued)

*Primary Examiner* — Dana Ross
*Assistant Examiner* — Adam M Eckardt

(57) ABSTRACT

Disclosed is a cooking apparatus including a cooking chamber and, being open in a first direction, a shelf insertable into the cooking chamber in the first direction and including a container, and a magnetron to generate a high frequency to be supplied to the shelf, wherein the shelf includes a heat generating member to generate heat by the high frequency generated from the magnetron, the container includes a first container disposed on one side in a second direction orthogonal to the first direction, a second container disposed on the other side in the second direction, and a holder to detachably support the first and second containers, the heat generating member includes a first heat generating member disposed on the first container to provide heat to the first container, and a second heat generating member disposed on the second container to provide heat to the second container.

14 Claims, 17 Drawing Sheets

(58) Field of Classification Search
CPC ......... F04D 29/60; F24C 7/02; H05B 6/6408; H05B 6/6482; H05B 6/6494; H05B 6/80; H05B 6/64
See application file for complete search history.

(56) References Cited

U.S. PATENT DOCUMENTS

| | | | | |
|---|---|---|---|---|
| 7,094,998 | B2 | 8/2006 | Shozo et al. | |
| 8,445,043 | B2 | 5/2013 | Jackson et al. | |
| 2011/0198344 | A1 * | 8/2011 | Uchiyama | H05B 6/647 219/680 |
| 2011/0297672 | A1 * | 12/2011 | Niklasson | H05B 6/6447 219/702 |
| 2016/0309941 | A1 | 10/2016 | Minard | |
| 2017/0095104 | A1 | 4/2017 | Kataoka et al. | |

FOREIGN PATENT DOCUMENTS

| | | | |
|---|---|---|---|
| JP | 2005-205196 | A | 8/2005 |
| JP | 2007-143804 | A | 6/2007 |
| JP | 2013-111107 | A | 6/2013 |
| JP | 2013-156001 | A | 8/2013 |
| KR | 10-2004-0088708 | A | 10/2004 |
| WO | 2016019218 | A1 | 2/2016 |

OTHER PUBLICATIONS

Office Action issued Jun. 20, 2024, in connection with Korean Patent Application No. 10-2020-0006791, 29 pages.

* cited by examiner

COOKING APPARATUS

CROSS-REFERENCE TO RELATED APPLICATION

This application is based on and claims priority under 35 U.S.C. § 119 to Korean Patent Application No. 10-2020-0006791 filed on Jan. 17, 2020 in the Korean Intellectual Property Office, the disclosure of which is incorporated by reference herein in its entirety.

BACKGROUND

1. Field

The disclosure relates to a cooking apparatus, and more particularly, relates to a characteristic of a cooking space inside a cooking chamber.

2. Description of the Related Art

A cooking apparatus is an apparatus for cooking by heating a cooking object such as food, and may provide various functions related to cooking, such as heating, defrosting, drying, and sterilization of the cooking object. Examples of such a cooking apparatus include an oven such as a gas oven and an electric oven, a microwave heating device (hereinafter, referred to as a microwave oven and microwave), a gas stove, an electric stove, a gas grill, and an electric grill.

In general, an oven is an apparatus that cooks food by directly transferring heat to food through a heating source that generates heat such as a heater or by heating the inside of a cooking chamber, and a microwave oven is an apparatus that cooks food by frictional heat between molecules generated by disturbing the molecular arrangement of food using high frequency as a heating source.

When two or more different foods are cooked through a cooking apparatus, optimum temperatures at which the respective foods are cooked may be different. In this case, because the cooking apparatus may only cook food at the same temperature, when different foods are cooked simultaneously through the cooking apparatus, the cooking condition of a part of food may be poor.

SUMMARY

It is an aspect of the disclosure to provide a cooking apparatus in which two or more different foods may be cooked at different optimum temperatures when the two or more different foods are cooked simultaneously by the cooking apparatus.

It is another aspect of the disclosure to provide a cooking apparatus in which two or more different foods may be easily cooked inside a cooking chamber through efficient partition of cooking regions.

Additional aspects of the disclosure will be set forth in part in the description which follows and, in part, will be obvious from the description, or may be learned by practice of the disclosure.

In accordance with an aspect of the disclosure, a cooking apparatus includes a cooking chamber in which food is cooked and being open in a first direction, a shelf configured to be inserted into the cooking chamber in the first direction and including a container in which food is placed, and a magnetron configured to generate a high frequency to be supplied to the shelf, wherein the shelf includes a heat generating member to generate heat by the high frequency generated from the magnetron, the container includes a first container disposed on one side in a second direction orthogonal to the first direction, a second container disposed on the other side in the second direction, and a holder configured to support the first and second containers, the heat generating member includes a first heat generating member disposed on the first container to provide heat to the first container, and a second heat generating member disposed on the second container to provide heat to the second container, and the first container and the second container are provided to be detachable with respect to the holder.

The first heat generating member may be configured to supply an amount of heat larger than an amount of heat supplied to the second container by the second heat generating member to the first container.

The holder of the shelf may include a frame having a long side extending in the second direction and a short side extending in the first direction, and a seating space formed inside the frame so that the first container or the second container is seated.

The heat generating member may include a ferrite material, and a content of the ferrite material in the first heat generating member and a content of the ferrite material in the second heat generating member may be different.

The content of the ferrite material in the first heat generating member may be larger than the content of the ferrite material in the second heat generating member.

The first heat generating member may be disposed on the opposite side of a first cooking surface on which food is placed in the first container in a third direction orthogonal to the first and second directions, and the second heat generating member may be disposed on the opposite side of a second cooking surface on which food is placed in the second container in the third direction.

The magnetron may be disposed below the cooking chamber in the third direction to face the first and second heat generating members.

The first container and the second container may be configured to be detachably seated in a third direction orthogonal to the first and second directions, respectively.

The holder may be configured to support the first container and the second container in the third direction.

The holder may further include an insertion hole formed along an inner surface of the frame forming the seating space to allow rims of the first and second containers to be inserted, and the first and second containers inserted into the insertion hole may be configured to be supported by the holder in a third direction orthogonal to the first and second directions.

The cooking apparatus may further include a heater disposed inside the cooking chamber opposite to the magnetron to provide heat to the first and second cooking surfaces.

The heater may include a first heater disposed to correspond to the first container in the third direction orthogonal to the first and second directions, and a second heater disposed to correspond to the second container in the third direction.

The first and second heaters may have long axes extending in a direction corresponding to the first direction and are disposed to be spaced apart from each other in the second direction.

The container may further include a third container disposed between the first container and the second container in the second direction, the heat generating member may further include a third heat generating member configured to provide heat to the third container, and the third heat generating member may be disposed on the opposite side of the third cooking surface on which food is placed in the third container in a third direction orthogonal to the first and second directions.

The third heat generating member may be configured to supply heat of a temperature, which is different from those of heat supplied to the first and second containers from the first and second heat generating members, to the third container.

In accordance with another aspect of the disclosure, a cooking apparatus includes a cooking chamber in which food is cooked and open in a first direction, a shelf configured to be inserted into the cooking chamber in the first direction and including a container in which food is placed, and a magnetron configured to generate a high frequency to be supplied to the shelf, wherein the shelf includes a heat generating member to generate heat by the high frequency generated from the magnetron, the container includes a first container disposed on one side in a second direction orthogonal to the first direction, a second container disposed on the other side in the second direction, and a holder configured to support the first and second containers, the heat generating member includes a first heat generating member disposed on the first container to provide heat to the first container, and a second heat generating member disposed on the second container to provide heat to the second container, and the first container is configured to supply an amount of heat larger than an amount of heat supplied to the second container by the second heat generating member to the first container.

The first container and the second container may be configured to be detachable in a third direction orthogonal to the first and second directions with respect to the holder.

The beat generating member may include a ferrite material and a content of the ferrite material in the first heat generating member and a content of the ferrite material in the second heat generating member may be different.

The cooking apparatus may further include a heater disposed inside the cooking chamber opposite to the magnetron to provide heat to a first cooking surface and a second cooking surface disposed on the opposite side of the first beat generating member and the second heat generating member respectively, wherein the heater may include a first heater disposed to correspond to the first container in the third direction orthogonal to the first and second directions, and a second heater spaced apart in the second direction with respect to the first heater and disposed to correspond to the second container in the third direction.

In accordance with another aspect of the disclosure, a cooking apparatus includes a cooking chamber in which food is cooked and being open in a first direction, a shelf configured to be inserted into the cooking chamber in the first direction and on which food is placed, and a magnetron configured to generate a high frequency to be supplied to the shelf, wherein the shelf includes a holder having a long side extending in a second direction orthogonal to the first direction and a short side extending in the first direction, a first container and a second container configured to be seated on the holder and in which food is placed, respectively, and a first heat generating member and a second heat generating member configured to generate heat by a high frequency generated from the magnetron to transfer the heat to the first and second containers, respectively, and wherein the first container and the second container are configured to be disposed side by side in the second direction and to be detachably seated in a third direction orthogonal to the first and second directions with respect to the holder.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Configurations shown in the embodiments and the drawings described in the present specification are only the preferred embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

A cooking apparatus according to an embodiment of the disclosure will be described with a microwave oven as an example. However, the disclosure is not limited thereto, and the cooking apparatus according to an embodiment of the disclosure may be applied to other cooking apparatuses, such as a combination of an oven and a microwave.

Hereinafter, embodiments of the disclosure will be described in detail with reference to the accompanying drawings.

Figure 1:
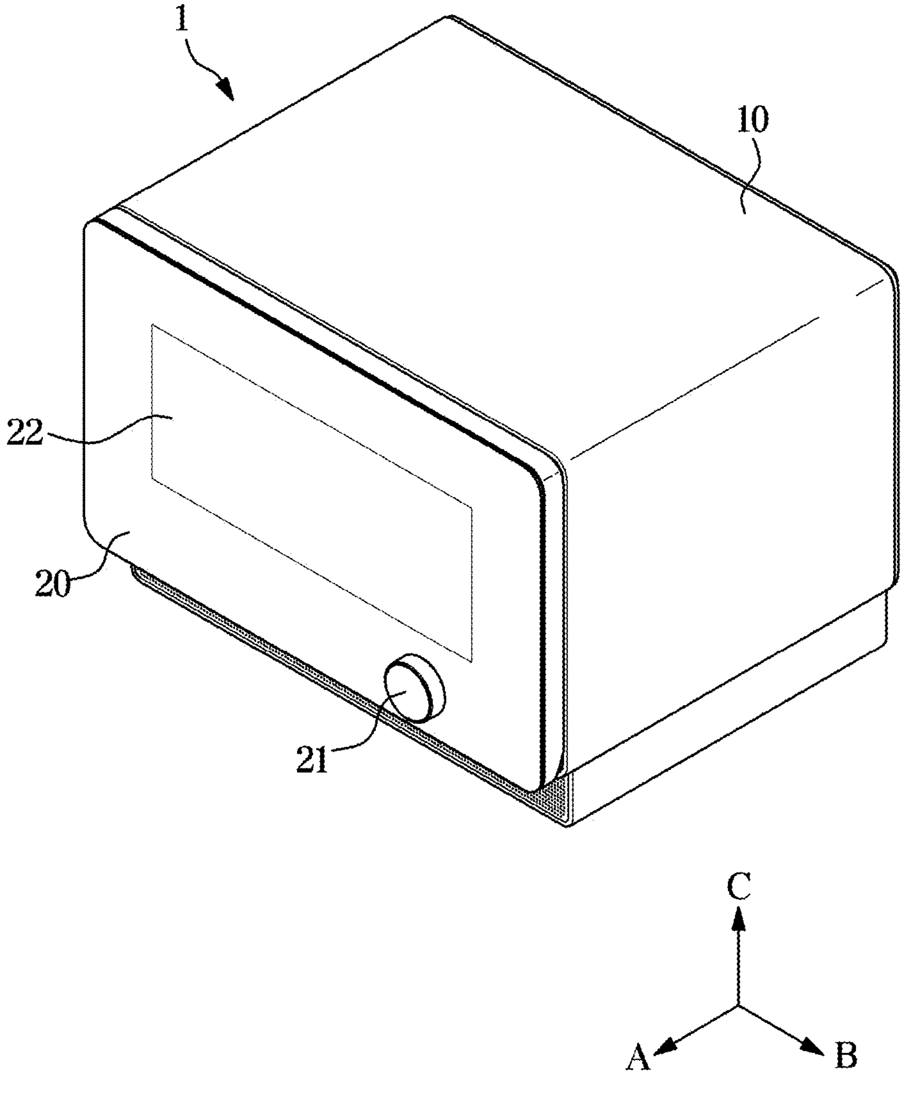
FIG. 1 is a perspective view of a cooking apparatus according to an embodiment of the disclosure.
Figure 2:
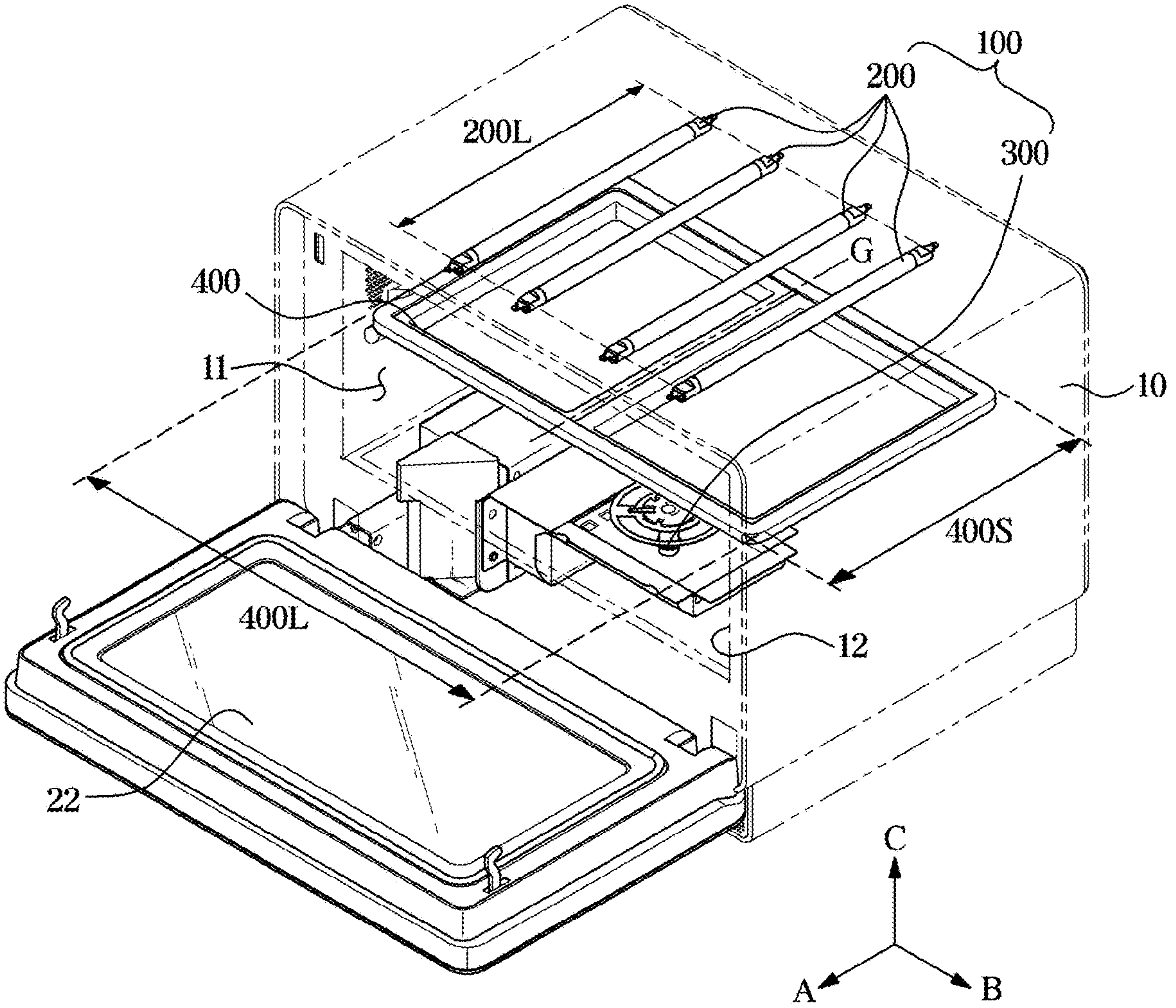
FIG. 2 illustrates some of components inside the cooking apparatus according to an embodiment of the disclosure.
Figure 3:
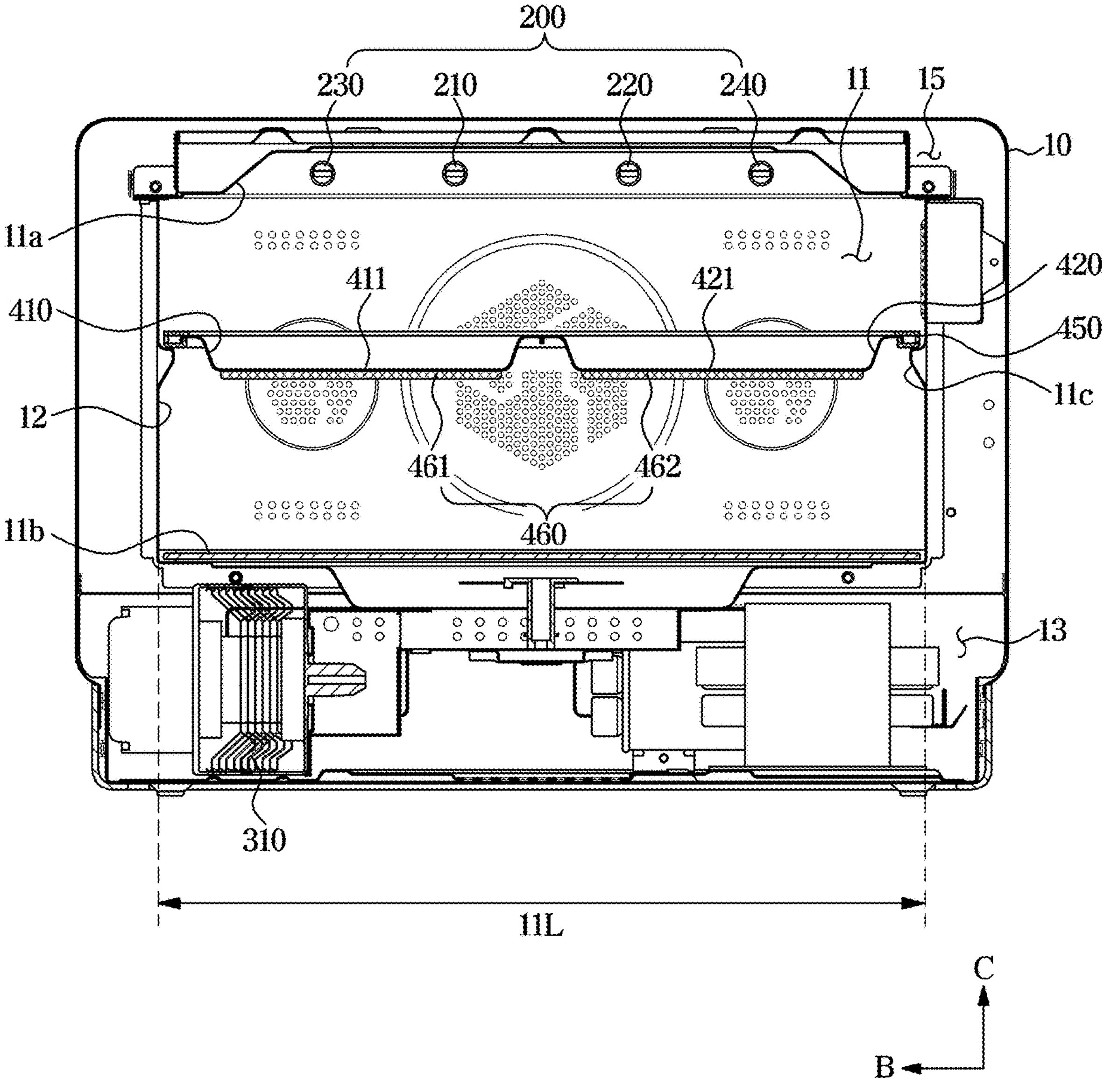
FIG. 3 is a cross-sectional view of the cooking apparatus according to an embodiment of the disclosure.
Figure 4:
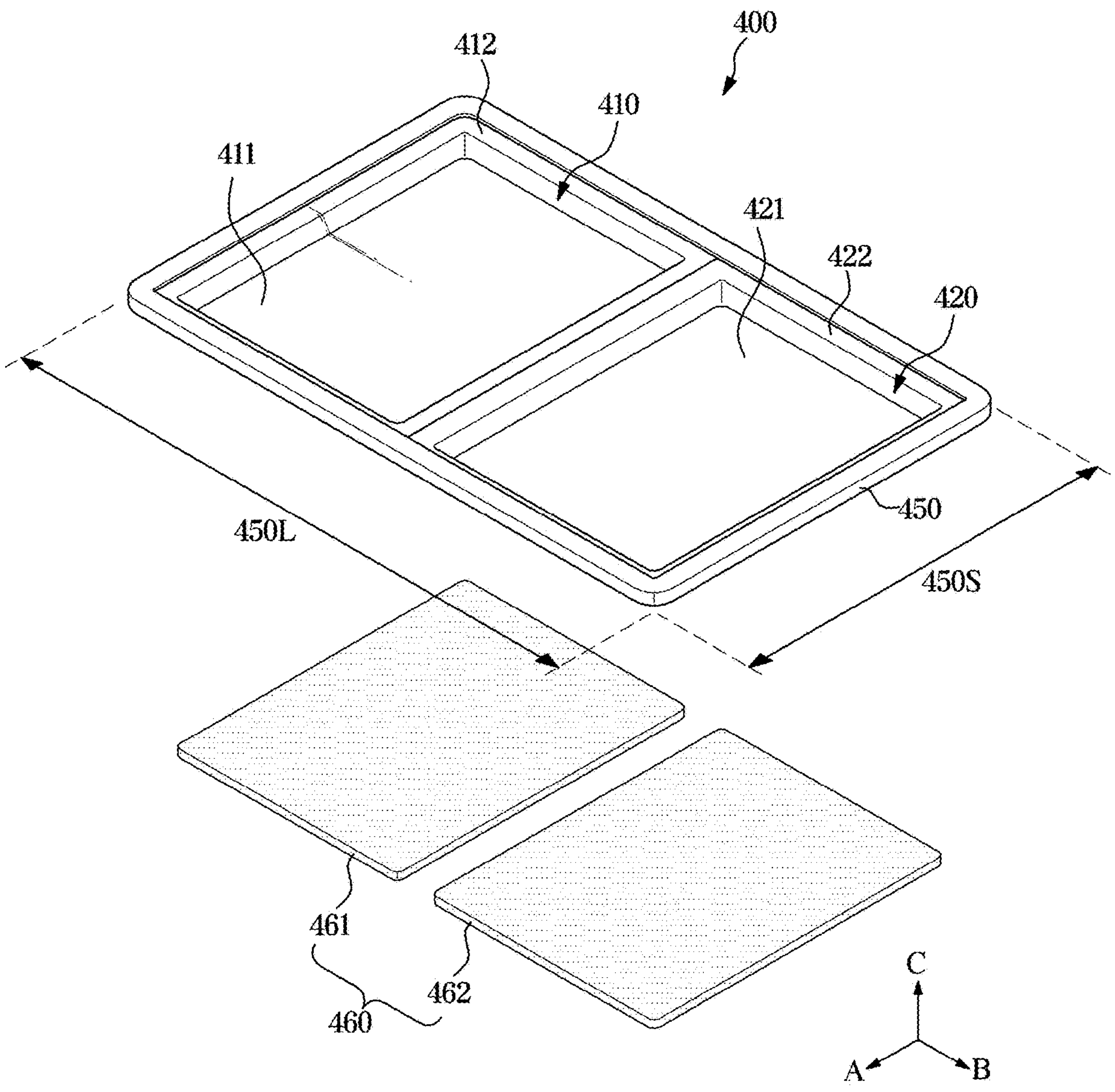
FIG. 4 is an exploded perspective view of a shelf according to an embodiment of the disclosure.
Figure 5:
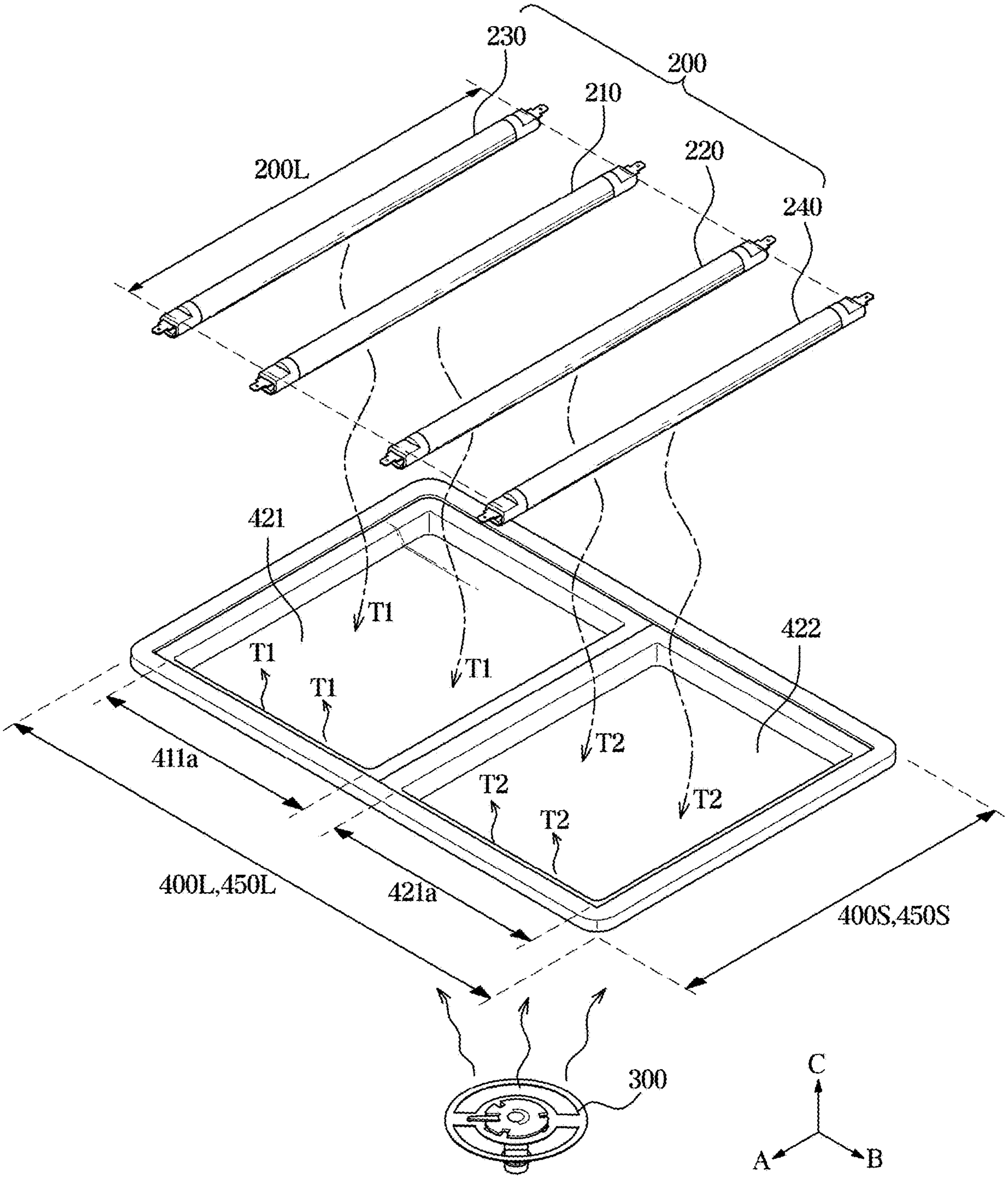
FIG. 5 illustrates some components according to an embodiment of the disclosure.

FIG. 1 is a perspective view of a cooking apparatus according to an embodiment of the disclosure, FIG. 2 illustrates some of components inside the cooking apparatus according to an embodiment of the disclosure, FIG. 3 is a cross-sectional view of the cooking apparatus according to an embodiment of the disclosure, FIG. 4 is an exploded perspective view of a shelf according to an embodiment of the disclosure, and FIG. 5 illustrates some components according to an embodiment of the disclosure.

A cooking apparatus 1 may include a housing 10 forming an outer appearance and a cooking chamber 11 provided inside the housing 10 and in which food may be placed.

The cooking apparatus 1 may include an inner housing 12 disposed inside the housing 10 and forming the cooking chamber 11. A predetermined spaced space 15 may be formed between the inner housing 12 and the housing 10.

The housing 10 and the inner housing 12 may be provided to open in a first direction A, which is a forward direction of the cooking apparatus 1.

A user may place food in the cooking chamber 11 through the opening of the inner housing 12 formed in the first direction A.

The cooking chamber 11 may be formed in a substantially rectangular parallelepiped shape having a long side in a second direction B that is orthogonal to the first direction A in left and right directions.

The cooking apparatus 1 may include a machine room 13 formed in the housing 10 and disposed below the cooking chamber 11. Various electric components for driving the cooking apparatus 1 may be disposed inside the machine room 13.

The cooking apparatus 1 may include a door 20 to open and close the openings of the housing 10 and the inner housing 12.

The door 20 may include an input 21 for inputting a signal so that the user controls the cooking apparatus 1. The input 21 is not limited to FIG. 1 and may include a display part (not shown) to display an image or a touch part (not shown) to input a signal by touching an image.

The door 20 may include a transparent member 22 to allow the user to observe the inside of the cooking chamber 11 when the door 20 is closed.

The cooking apparatus 1 may include a shelf 400 mounted inside the cooking chamber 11 and provided to allow a user to place food. The shelf 400 may be detachably disposed in the cooking chamber 11.

The cooking chamber 11 may include support parts 11*c* formed on opposite sides of the cooking chamber 11 such that the shelf 400 is mounted between an upper surface 11*a* and a lower surface 11*b* of the cooking chamber 11.

A plurality of the support parts 11*c* may be disposed in a third direction C that is orthogonal to the first direction A or the second direction B in upward and downward directions so that the shelf 400 is mounted at various heights.

The shelf 400 may include containers 410 and 420 on which food may be placed and a holder 450 to support the containers 410 and 420. A plurality of the containers 410 and 420 may be provided.

The shelf 400 may be configured to have a long side 400L extending in the second direction B and a short side 400S extending in the first direction A to correspond to the cooking chamber 11.

The containers 410 and 420 may include the first container 410 and the second container 420. The first container 410 may be disposed on one side in the second direction B, and the second container 420 may be disposed on the opposite side to the first container 410 in the second direction B.

That is, based on a center line Gi of the shelf 400 in the second direction B, the first container 410 may be disposed on one side of the center line G in the second direction B, and the second container 420 may be disposed on the opposite side.

Based on a direction in which the long side 400L of the shelf 400 extends, the first container 410 may be disposed on one side of the shelf 400 in a direction of the long side 400L, and the second container 420 may be disposed on the other side.

The first container 410 may include a first cooking surface 411 on which food is placed. The second container 420 may include a second cooking surface 421 on which food is placed.

The shelf 400 may include the holder 450 to support the first container 410 and the second container 420.

The holder 450 may form an edge of the shelf 400. The holder 450 may include a long side 450L corresponding to the long side 400L of the shelf 400 and a short side 4508 corresponding to the short side 400S of the shelf 400.

The holder 450 may be configured to support the first container 410 and the second container 420 so that the first container 410 and the second container 420 are arranged side by side in the long side 450L direction of the holder 450.

The first cooking surface 411 and the second cooking surface 421 may be disposed to face the upper surface 11*a* of the cooking chamber 11 when the shelf 400 is mounted.

The cooking apparatus 1 may include a heating source 100 providing heat to the inside of the cooking chamber 11 so that food is cooked by heat.

The heating source 100 may be configured to provide heat to food placed on the shelf 400 so that the food may be cooked. Food may also be placed on the lower surface 11*b* of the cooking chamber 11 without the shelf 400. Even in this case, the heating source 100 may provide heat to the food located on the lower surface 11*b*.

The heating source 100 may include a first heating source 200 disposed on the upper surface 11*a* of the cooking chamber 11.

The heating source 100 may include a second heating source 300 disposed on the lower surface 11*b* of the cooking chamber 11.

The first heating source 200 may include a plurality of heaters 210, 220, 230, and 240 to generate radiant heat. The plurality of heaters 210, 220, 230, and 240 may transmit heat directly to food by radiating heat generated by itself.

The second heating source 300 may include a magnetron 310 generating a high frequency. The high frequency generated from the magnetron 310 may be injected into food so that the inside of the food is cooked by frictional heat between molecules generated by repeatedly converting the molecular arrangement of moisture contained in the food.

The magnetron 310 may be disposed in the machine room 13. As the magnetron 310 oscillates a high frequency from the machine room 13 toward the lower surface 11*b* of the cooking chamber 11, the high frequency may pass through the lower surface 11*b* and be irradiated to the shelf 400.

A conventional microwave type cooking apparatus is configured to cook food through a single magnetron. In this case, a high frequency may not be transmitted evenly to all parts of food depending on the moisture distribution or content of the food, so that the food may not be efficiently cooked.

In order to solve such a problem, a heater capable of transferring heat to all parts of food needs to be additionally provided in a microwave oven, and a heat generating part needs to be mounted on a shelf. In particular, in the case of a food that needs to be cooked through a higher temperature outside the food, cooking may be efficiently performed through heat from the additional heater and heat transferred from the heat generating part.

The cooking apparatus 1 according to an embodiment of the disclosure may also efficiently perform cooking of food by including the first heating source 200 and the second heating source 300.

As described above, the first heating source 200 may efficiently transmit radiant heat to an upper side of food through the plurality of heaters 210, 220, 230, and 240 disposed on the upper surface 11*a* of the cooking chamber 11.

However, it may be difficult to transfer heat to a lower side of food through the plurality of heaters 210, 220, 230, and 240.

In this case, in order to transfer additionally heat to the lower side of the food, the user needs to stop the cooking apparatus 1 in operation, pull out the shelf 400 from the cooking chamber 11, turn the food over, put the shelf 400 into the cooking chamber 11, and operate the cooking apparatus 1 again.

In order to solve such a problem, the cooking apparatus 1 according to an embodiment of the disclosure may include a heat generating member 460 disposed on the shelf 400 so that heat is transferred to a lower side of food during cooking.

The heat generating member 460 may be disposed on a side opposite to each of the cooking surfaces 411 and 421 of the containers 410 and 420 of the shelf 400. The heat generating member 460 may be disposed to face the lower surface 11*b* of the cooking chamber 11 when the shelf 400 is mounted on the cooking chamber 1.

A plurality of the heat generating member 460 may be provided. Specifically, the heat generating member 460 may have a number corresponding to the number of the plurality of containers 410 and 420.

The heat generating member 460 may include a first heat generating member 461 coupled to the first container 410 and a second heat generating member 462 coupled to the second container 420.

The first heat generating member 461 may be disposed at a position corresponding to the first cooking surface 411 in the third direction C. That is, the first heat generating member 461 may be disposed on a surface opposite to the first cooking surface 411 of the first container 410.

The second heat generating member 462 may be disposed at a position corresponding to the second cooking surface 421 in the third direction C. That is, the second heat generating member 462 may be disposed on a surface opposite to the second cooking surface 421 of the second container 420.

The heat generating member 460 may absorb a high frequency generated by the magnetron 310 to generate heat. The high frequency radiated from the magnetron 310 facing the heat generating member 460 is absorbed by the heat generating member 460 and the heat generating member 460 may generate heat by the absorbed high frequency.

Heat generated by the heat generating member 460 may be transferred to the cooking surfaces 411 and 421 through the containers 410 and 420 of the shelf 400.

That is, as heat generated by the heat generating member 460 is conducted to each of the cooking surfaces 411 and 421, heat may be supplied to a lower side of food placed on each of the cooking surfaces 411 and 421.

The heat generating member 460 may be formed of a ferrite material to absorb a high frequency. However, the disclosure is not limited thereto, and a material capable of generating heat by a high frequency may be mixed with ceramic or the like to form the heat generating member 460.

Accordingly, heat may be supplied to upper and lower sides of food, respectively, so that cooking may be efficiently performed without the user additionally turning over the food.

A case where a plurality of foods having different cooking temperatures is simultaneously placed in a cooking chamber and cooked may often occur. In this case, the cooking apparatus may individually set a plurality of heaters so that the temperatures of heat generated from the plurality of heaters are different.

That is, a temperature of heat generated by one of the plurality of heaters is set to be different from a temperature of heat generated by the other heater, so that heat of a different temperature may be transferred to each of the plurality of foods.

When a plurality of heaters is disposed on the upper surface 11*a* of the cooking chamber 11 as in an embodiment of the disclosure, and each of the heaters provides heat of a different temperature, a temperature of heat corresponding to heat provided from each of the heaters may be provided at a position corresponding to each of the heaters in the third direction C in the cooking chamber 11. Specifically, regions in which temperatures provided are different from each other may be formed on each of the cooking surfaces 411 and 421 of the shelf 400.

As described above, the shelf 400 includes the first container 410 and the second container 420, the first and second containers 410 and 420 include the cooking surfaces 411 and 421, respectively, and a different temperature may be provided to each of the cooking surfaces 411 and 421.

That is, the first container 410 and the second container 420 are arranged side by side in the direction in which the long side 400L of the shelf 400 extends, and different temperatures may be provided to each of the containers 410 and 420 from the plurality of heaters 210, 220, 230, and 240.

Some of the plurality of heaters 210, 220, 230, and 240 may be disposed at a position corresponding to the first cooking surface 411 of the first container 410 in the third direction C. Also, other heaters among the plurality of heaters 210, 220, 230 and 240 may be provided at a position corresponding to the second cooking surface 421 of the second container 420 in the third direction C. Accordingly, heat of a different temperature generated from each heater may be directly transferred to the first cooking surface 411 and the second cooking surface 421.

Therefore, even when a plurality of foods having different cooking temperatures is simultaneously placed in the cooking chamber 11, the plurality of heaters 210, 220, 230, and 240 may each provide heat of different temperatures to the foods placed in the first container 410 and the second container 420. That is, when foods are placed in different regions, the respective foods may be cooked at different temperatures.

The cooking chamber 11 is formed in a rectangular parallelepiped shape having a long side 111L extending in the second direction B, and the corresponding shelf 400 may also be formed in a rectangular shape having the long side 400L in the second direction B and the short side 400S in the first direction A, as described above.

When a region in which food is placed and cooked on the shelf 400 is referred to as a cooking region, the first cooking surface 411 and the second cooking surface 421 may form a cooking region. The first cooking surface 411 and the second cooking surface 421 are provided as separate configurations, a temperature of heat supplied to each of the cooking surfaces 411 and 421 is different so that each of the cooking surfaces 411 and 421 may form a cooking region having a different cooking temperature, and the cooking regions may be partitioned by the first cooking surface 411 and the second cooking surface 421.

According to an embodiment of the disclosure, the first cooking surface 411 and the second cooking surface 421 are arranged in the direction of the long side 400L of the shelf 400, and the cooking regions of the shelf 400 may be partitioned in the direction of the long side 400L of the shelf 400.

Unlike this, when the cooking regions are partitioned in the first direction A, which is a direction of the short side 400S of the shelf 400, extending lengths of the cooking regions partitioned in the first direction A are bound to be short.

Accordingly, when a bulky food is cooked, a part of the food is disposed over a plurality of regions having different temperatures, for example, over a plurality of containers, so that the part of the food may not be cooked at an appropriate temperature.

Also, although the user may observe the respective foods from the outside of the cooking apparatus 1 through the transparent member 22, as one of the foods is disposed deeply in the first direction A, the user may not be able to observe the cooking process of the food.

In order to solve such a problem, in the cooking apparatus 1 according to an embodiment of the disclosure, the first cooking surface 411 and the second cooking surface 421 are arranged along the long side 400L of the shelf 400 so that the cooking regions may be partitioned in the direction of the long side 400L of the shelf 400.

The plurality of heaters 210, 220, 230, and 240 of the cooking apparatus 1 each may be configured to have a long axis 200L extending in the first direction A, and the heaters 210, 220, 230, and 240 may be disposed to be spaced apart in the second direction B corresponding to the direction in which the long side 400L of the shelf 400 extends.

The plurality of heaters 210, 220, 230, and 240 may be configured to provide heat of different temperatures to the first cooking surface 411 and the second cooking surface 421 partitioned in the direction of the long side 400L, of the shelf 400.

Also, the heat generating member 460 may be configured to provide heat of different temperatures to the first cooking surface 411 and the second cooking surface 421 partitioned in the direction of the long side 400L of the shelf 400.

As described above, the first heat generating member 461 is coupled to the first container 410 and the second heat generating member 462 is coupled to the second container 420, the first container 410 and the second container 420 are arranged side by side in the direction of the long side 4001 of the shelf 400, and the first heat generating member 461 and the second heat generating member 462 may also be arranged side by side in the direction of the long side 400L of the shelf 400.

The first heater 210 may be disposed on one side in the second direction B and the second heater 220 may be disposed on the opposite side of the first heater 210 in the second direction B.

Specifically, with respect to the center line G of the shelf 400 based on the second direction B, the first beater 210 may be disposed on one side and the second heater 220 may be disposed on the opposite side. The third heater 230 may be disposed on one side adjacent to the first heater 210, and the fourth heater 240 may be disposed on the opposite side adjacent to the second heater 220.

The first heater 210 and the third heater 230 may generate heat of the same temperature. Also, the second heater 220 and the fourth heater 240 may generate heat of the same temperature.

The first and third heaters 210 and 230 and the second and fourth heaters 220 and 240 may each generate heat of different temperatures. That is, based on the center line G, a temperature of heat generated at one side of the center line G may be different from a temperature of heat generated at the opposite side.

When a temperature of heat generated by the first and third heaters 210 and 230 is set higher than a temperature of heat generated by the second and fourth heaters 220 and 240, the cooking apparatus 1 may control the plurality of heaters 210, 220, 230, and 240 so that the temperature of heat generated by the first and third heaters 210 and 230 is higher than the temperature of heat generated by the second and fourth heaters 220 and 240.

Alternatively, temperatures of heat generated by the plurality of heaters 210. 220, 230, and 240 are all set to be the same, and the cooking apparatus 1 may control the plurality of heaters 210.220, 230, and 240 so that the first and third heaters 210 and 230 are continuously operated while the cooking apparatus 1 is operated and the second and fourth heaters 220 and 240 are operated while being repeatedly turned on and off. Accordingly, the total temperature of heat generated by the first and third heaters 210 and 230 may be higher than the total temperature of heat generated by the second and fourth heaters 220 and 240.

As described above, based on the center line G, the first container 410 may be disposed on one side and the second container 420 may be disposed on the opposite side.

The first cooking surface 411 of the first container 410 may be disposed at a position corresponding to the first and third heaters 210 and 230 in the third direction C. The second cooking surface 421 of the second container 420 may be disposed at a position corresponding to the second and fourth heaters 220 and 240 in the third direction C.

As described above, because heat generated by the first and third heaters 210 and 230 and heat generated by the second and fourth heaters 240 are different, a temperature of heat transferred to the first cooking surface 411 and a temperature of heat transferred to the second cooking surface 421 may be different.

Heat generated by the first and third heaters 210 and 230 may be transferred to the first cooking surface 411 from the upper surface 11*a*, and heat generated by the second and fourth heaters 220 and 240 may be transferred to the second cooking surface 421 from the upper surface 11*a*.

Because heat generated by the first and third heaters 210 and 230 and heat generated by the second and fourth heaters 240 are different so that temperatures of heat transferred to the first container 410 and the second container 420 are different, foods having different cooking temperatures may be placed on the first cooking surface 411 of the first container 410 and the second cooking surface 421 of the second container 420, respectively, and cooked simultaneously in the cooking chamber 11.

Also, different foods may be placed in the left and right directions based on the first direction A, which is in front of the cooking apparatus 1, so that the user may easily observe the cooking process of the different foods through the transparent member 22 in real time while the cooking apparatus 1 is cooking.

Heat conducted from the first heat generating member 461 and heat conducted from the second heat generating member 462 may be transferred to the first and second containers 410 and 420, respectively. The heat generating member 460 is heated by a high frequency oscillated from the magnetron 310 disposed on the lower surface 11*b* as described above, and the heat generated from the heat generating member 460 may be conducted to the first and second cooking surfaces 411 and 421 through the first and second containers 410 and 420.

As described above, while heat of a different temperature is supplied to the upper sides of the first and second cooking surfaces 411 and 421 by the plurality of heaters 210, 220, 230, and 240, heat of the same temperature may be supplied to the lower sides of the first and second cooking surfaces 411 and 421 by the heat generating member 460.

While foods having different appropriate cooking temperatures may be cooked on the first and second cooking surfaces 411 and 421 as described above, when heat of the same temperature is supplied from the lower sides of the first and second cooking surfaces 411 and 421, heat of a temperature different from an appropriate cooking temperature may be supplied to at least one of the first and second cooking surfaces 411 and 421, so that cooking performance may decrease.

That is, in a case where the user turns over or does not turn over food placed on at least one of the first and second cooking surfaces 411 and 421 during cooking when heat of the same temperature is supplied from the lower sides of the first and second cooking surfaces 411 and 421, heat of an appropriate temperature is not supplied to the food, so that the food may be cooked perfectly.

To prevent this, the heat generating member 460 may include the first heat generating member 461 and the second heat generating member 462 that emit heat of different temperatures to the first and second cooking surfaces 411 and 421, respectively.

That is, the first heat generating member 461 and the second heat generating member 462 may be configured to generate heat of different temperatures when absorbing the same amount of high frequency.

The first heat generating member 461 may be disposed at a position corresponding to the first cooking surface 411 in the third direction C. The second heat generating member 462 may be disposed at a position corresponding to the second cooking surface 421 in the third direction C.

The first heat generating member 461 may generate heat to provide heat of a predetermined temperature to the first cooking surface 411. The second heat generating member 462 may generate heat to provide heat of a temperature, which is different from the temperature generated by the first heat generating member 461, to the second cooking surface 421.

Accordingly, heat of the same temperature as heat generated by each of the first heat generating member 461 and the second heat generating member 462 may be transferred to the lower side of each of the cooking surfaces 411 and 421. Therefore, heat of a different temperature is transferred to each of the lower sides of the first and second cooking surfaces 411 and 421, and foods placed on each of the cooking surfaces 411 and 421 may be cooked at different temperatures.

As described above, the heat generating member 460 may include a ferrite material. A content of the ferrite material in the first heat generating member 461 and a content of the ferrite material in the second heat generating member 462 may be different.

That is, the heat generating member 460 is configured to contain the ferrite material as a whole, and the content of the ferrite material in the first heat generating member 461 and the content of the ferrite material in the second heat generating member 462 may be different.

According to an embodiment of the disclosure, the content of the ferrite material in the first heat generating member 461 may be larger than the content of the ferrite material in the second heat generating member 462.

The ferrite material may generate heat by absorbing a high frequency generated from the magnetron 310, and the first heat generating member 461 containing more ferrite material than the second heat generating member 462 may generate heat of a higher temperature than the second heat generating member 462.

Accordingly, the first heat generating member 461 may generate heat of a higher temperature than the second heat generating member 462.

Therefore, foods having different cooking temperatures may be cooked simultaneously through the cooking apparatus 1. As a food having a relatively high appropriate cooking temperature is placed on the first cooking surface 411 and a food having a relatively low appropriate cooking temperature is placed on the second cooking surface 421, even when the foods are cooked simultaneously, each food may be cooked at each appropriate cooking temperature.

However, the disclosure is not limited to the above embodiment, and at least one of the first heat generating member 461 and the second heat generating member 462 may include a material, that generates heat by a high frequency, other than the ferrite material Herein, the other material may be a material capable of being heated at a temperature different from that of heat generated from ferrite when the same high frequency is absorbed.

Also, the first heat generating member 461 and the second heat generating member 462 may be configured such that other materials are mixed with the ferrite material, respectively. Accordingly, even when the same high frequency is absorbed by the first heat generating member 461 and the second heat generating member 462, the temperatures of heat generated by the first heat generating member 461 and the second heat generating member 462 may be different by the other materials.

The first heat generating member 461 may be disposed at a position corresponding to the first heater 210 in the third direction C. The second heat generating member 462 may be disposed at a position corresponding to the second heater 220 in the third direction C.

Heat generated by the first and third heaters 210 and 230 may be supplied to the upper side of the first cooking surface 411, and heat generated by the first heat generating member 461 may be supplied to the lower side of the first cooking surface 411.

Heat generated by the second and fourth heaters 220 and 240 may be supplied to the upper side of the second cooking surface 421, and heat generated by the second heat generating member 462 may be supplied to the lower side of the second cooking surface 42.

A temperature T1 of heat supplied from the first and third heaters 210 and 230 and the temperature T1 of beat generated from the first heat generating member 461 may be substantially the same. Accordingly, heat of substantially the same temperature T1 in the upward and downward directions with respect to the third direction C may be provided to food placed on the first cooking surface 411.

A temperature T2 of heat supplied from the second and fourth heaters 220 and 240 and the temperature T2 of heat generated from the second heat generating member 462 may be substantially the same. Accordingly, heat of substantially the same temperature T2 in the upward and downward directions with respect to the third direction C may be provided to food placed on the second cooking surface 421.

The temperature T1 of beat supplied from the first and third heaters 210 and 230, the temperature T1 of heat generated from the first heat generating member 461, the temperature T2 of heat supplied from the second and fourth heaters 220 and 240, and the temperature T2 of heat generated from the second heat generating member 462 each may be controlled by a controller (not shown).

While an appropriate cooking temperature may vary depending on the type of food, the temperature T1 of heat supplied from the first and third heaters 210 and 230 and the temperature T1 of heat generated from the first heat generating member 461 may be controlled by the controller (not shown) so that the temperature T1 of heat supplied from the first and third heaters 210 and 230 and the temperature T1 of heat generated from the first heat generating member 461 correspond to an appropriate cooking temperature of food placed on the first cooking surface 411.

Also, the temperature T2 of heat supplied from the second and fourth heaters 220 and 240 and the temperature T2 of heat generated from the second heat generating member 462 may be controlled by the controller (not shown) so that the temperature T2 of heat supplied from the second and fourth heaters 220 and 240 and the temperature T2 of heat generated from the second heat generating member 462 correspond to an appropriate cooking temperature of food placed on the second cooking surface 421.

As such, the heat generating member 460 includes the first heat generating member 461 and the second heat generating member 462 capable of generating heat of the temperatures T1 and T2 different from each other and may provide heat of different temperatures to the first and second cooking surfaces 411 and 421 corresponding to the heat generating members 461 and 462, respectively.

Accordingly, foods having different cooking temperatures on the first and second cooking surfaces 411 and 421 may be simultaneously cooked through the cooking apparatus 1.

As described above, like the heat generating member 460, the plurality of heaters 210, 220, 230, and 240 may each provide heat of different temperatures to the first and second cooking surfaces 411 and 421.

Temperatures of heat that are provided to the first cooking surface 411 by the first heating source 200 and the heat generating member 460 in the upward and downward directions, respectively, may be substantially similar, and temperatures of heat that are provided to the second cooking surface 421 by the first heating source 200 and the heat generating member 460 in the upward and downward directions, respectively, may be substantially similar.

Heat of substantially the same temperature may be uniformly supplied to the first cooking surface 411 in the upward and downward directions. Heat of a temperature different from the temperature of heat supplied to the first cooking surface 411 may be uniformly supplied to the second cooking surface 421 in the upward and downward directions.

Therefore, by the heat generating member 460 including the plurality of heaters 210, 220, 230, and 240 providing heat of different temperatures to each of the cooking surfaces 411 and 421, and the first heat generating member 461 and the second heat generating member 462 providing heat of different temperatures to each of the cooking surfaces 411 and 421, foods having different cooking temperatures may be placed on the first cooking surface 461 and the second cooking surface 462, respectively, and receive heat of different temperatures, to be stably cooked simultaneously.

Unlike an embodiment of the disclosure, when the direction in which the first container 410 and the second container 420 are arranged is the first direction A, the first cooking surface 411 and the second cooking surface 421 may be formed not to have a sufficient length in one direction. That is, when the first container 410 and the second container 420 are arranged side by side in the direction of the short side 400S of the shelf 400 or the short side 4508 of the holder 450, lengths of the first and second cooking surfaces 411 and 421 in the first direction A may be shortened.

However, as described above, because the plurality of heaters 210, 220, 230, and 240 of the cooking apparatus 1 according to an embodiment of the disclosure may be disposed to be spaced apart from each other in the second direction B, the first and second containers 410 and 420 may be arranged in the second direction B, and at the same time, the first cooking surface 411 and the second cooking surface 421 may be arranged side by side in the second direction B, the long side 400L of the shelf 400 or the long side 450L of the holder 450 extends in the second direction B, so that the first cooking surface 411 and the second cooking surface 421 may have a sufficient length in one direction.

That is, when the length of the first cooking surface 411 in the second direction B is referred to as a first length 411*a* and the length of the second cooking surface 421 in the second direction B is referred to as a second length 421*a*, the first length 411*a* and the second length 421*a* may be provided to substantially secure a sufficient area so that food may be placed inside the first cooking surface 411 or the second cooking surface 421.

Accordingly, areas of the first cooking surface 411 and the second cooking surface 421 on which different foods may be placed may be formed as 411*a**450S and 421*a**450S, respectively. The first length 411*a* or the second length 421*a* may have a length substantially corresponding to the short side 400S of the shelf 400 or the short side 450S of the holder 450.

Cross sectional areas of the first cooking surface 411 and the second cooking surface 421 may be formed in a substantially square shape, and food may be easily placed inside the first cooking surface 411 or the second cooking surface 421.

The disclosure is not limited thereto, and the first length 411*a* or the second length 421*a* may be provided substantially differently from a length of the short side 400S of the shelf 400 or the short side 450S of the holder 450, and the cross sectional areas of the first and second cooking surfaces 411 and 421 may be formed in a rectangular shape.

However, a ratio (411*a*/400S or 421*a*/400S) of the short side 400S of the shelf 400 to the first length 411*a* or the second length 421*a* may be provided larger than a ratio of the long side 400L of the shelf 400 to a length when the first and second cooking surfaces 411 and 421 are arranged in the first direction A.

That is, as the first cooking surface 411 and the second cooking surface 421 are arranged in the direction of the long side 400L of the shelf 400, the areas of the cooking surfaces 411 and 421 may be efficiently partitioned. This is because the containers 410 and 420 may be arranged in the second direction 13, and the first heat generating member 461 and the second heat generating member 462 capable of generating heat at different temperatures may be coupled to the first and second containers 410 and 420, respectively, to be arranged side by side in the second direction B.

Hereinafter, a technical feature in which the first and second containers 410 and 420 according to an embodiment of the disclosure are detachably coupled with respect to the holder 450 will be described.

Figure 6:
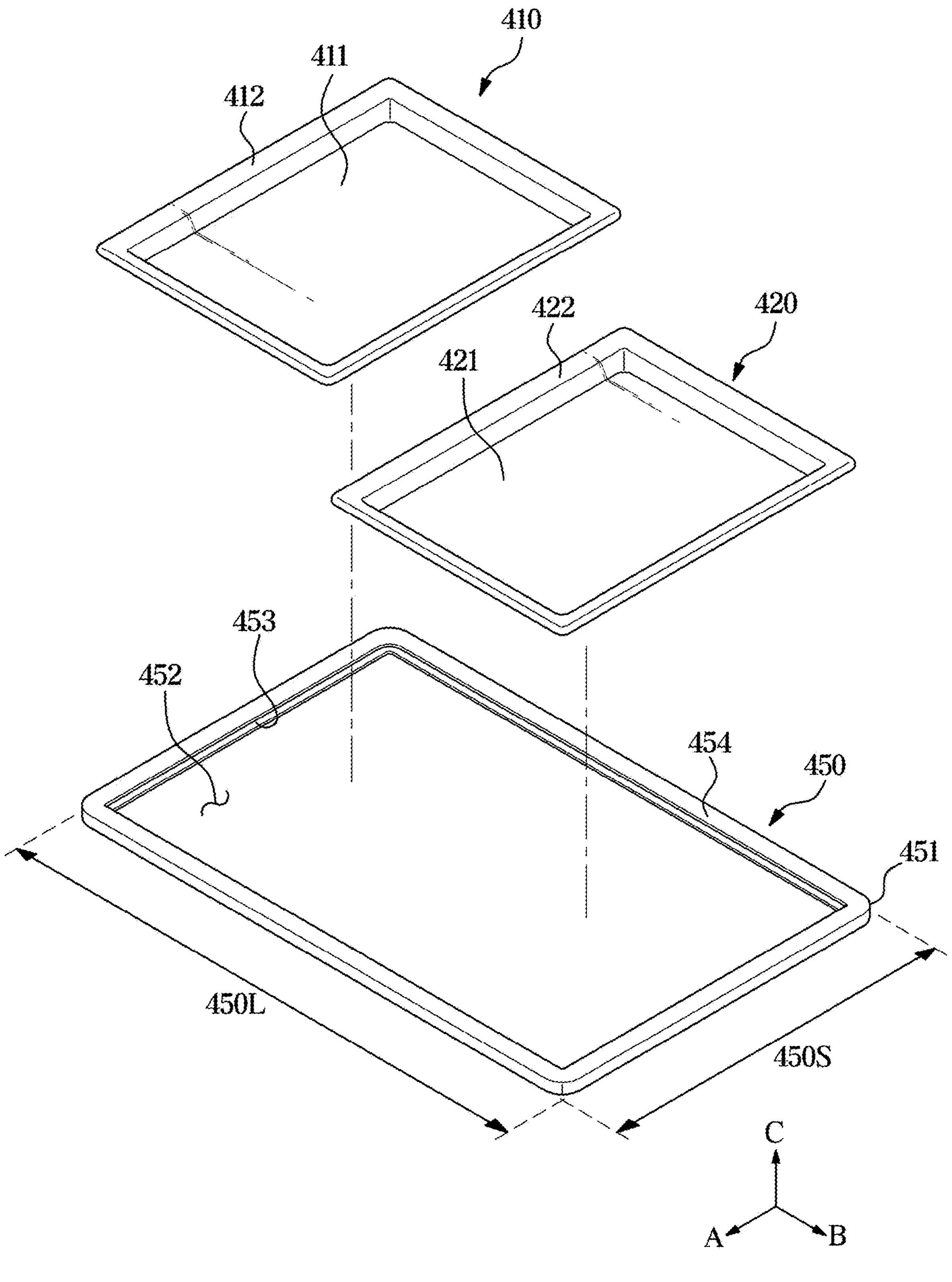
FIG. 6 illustrates a state in which a plurality of containers of the shelf is separated according to an embodiment of the disclosure.
Figure 7:
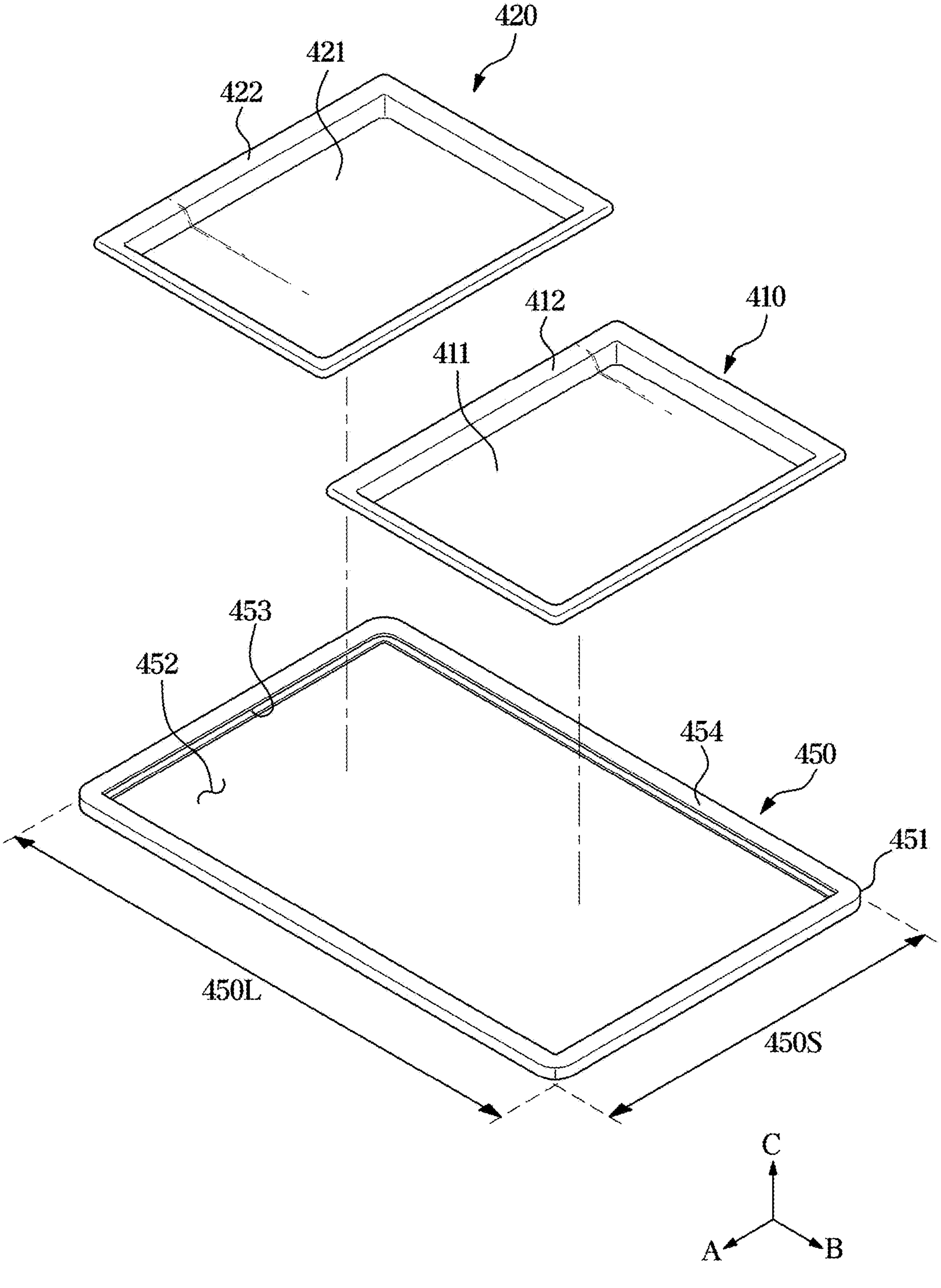
FIG. 7 illustrates a state in which the plurality of containers arranged differently from FIG. 5 is separated according to an embodiment of the disclosure.
Figure 8:
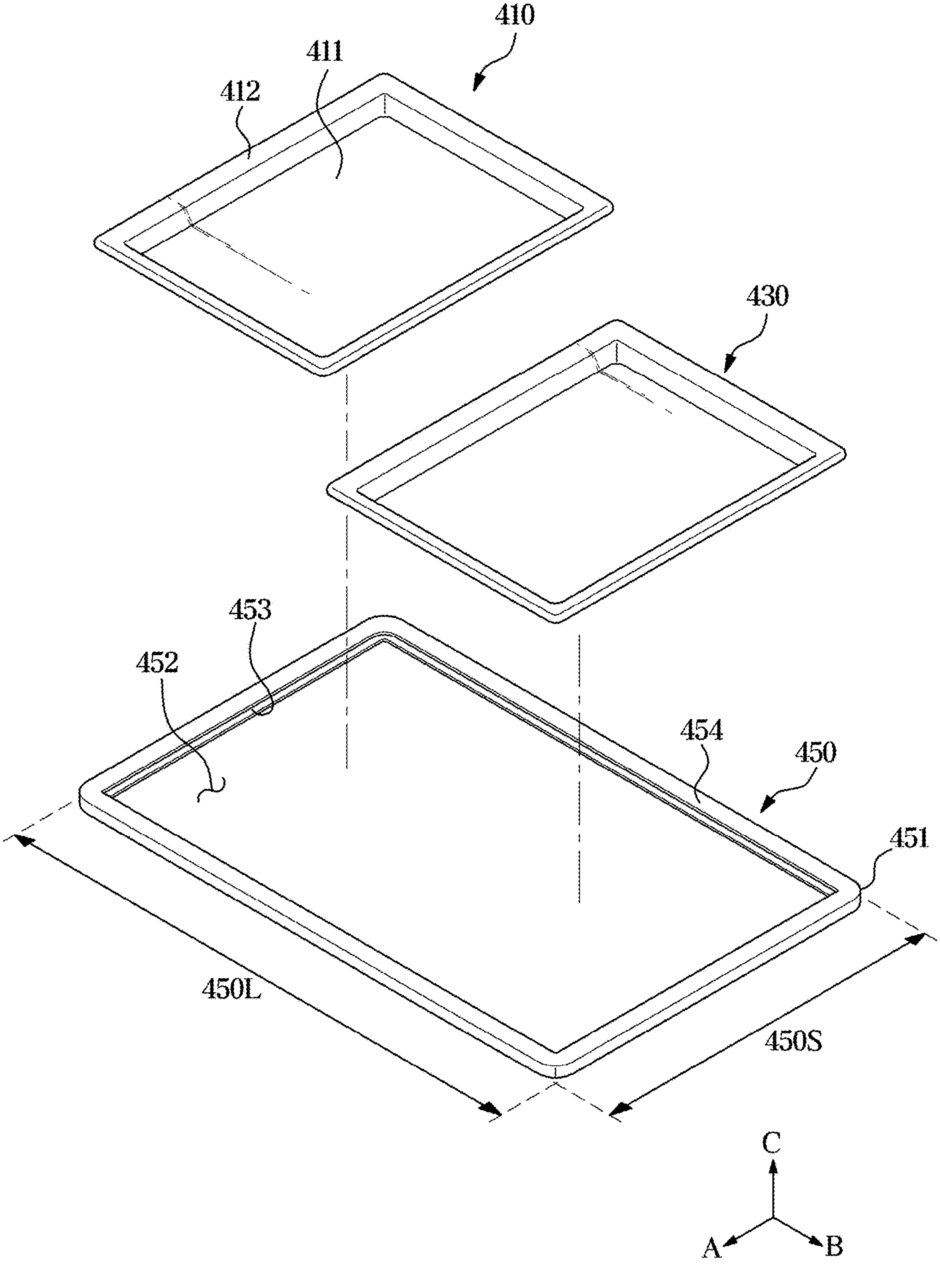
FIG. 8 illustrates a state in which the plurality of containers arranged differently from FIG. 5 is separated according to an embodiment of the disclosure.
Figure 9:
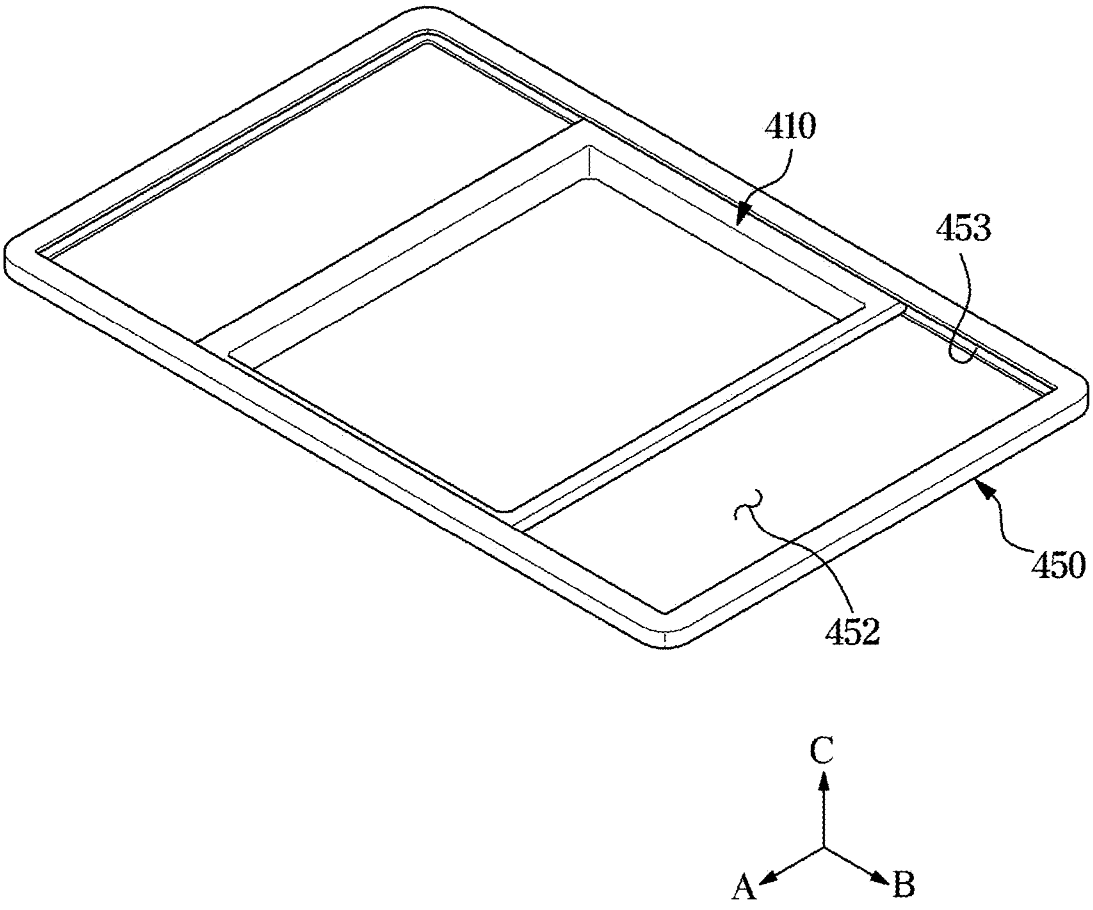
FIG. 9 shows a state in which only one of the plurality of containers of the shelf is disposed according to an embodiment of the disclosure.

FIG. 6 illustrates a state in which a plurality of containers of the shelf is separated according to an embodiment of the disclosure, FIG. 7 illustrates a state in which the plurality of containers arranged differently from FIG. 5 is separated according to an embodiment of the disclosure, FIG. 8 illustrates a state in which the plurality of containers arranged differently from FIG. 5 is separated according to an embodiment of the disclosure, and FIG. 9 shows a state in which only one of the plurality of containers of the shelf is disposed according to an embodiment of the disclosure.

As described above, the shelf 400 may include the first container 410 and the second container 420 provided as separate configurations. The temperature of heat supplied to the first container 410 and the temperature of heat supplied to the second container 420 are provided differently.

Unlike an embodiment of the disclosure, when regions to which heat of different temperatures is provided are partitioned in a single container, a temperature difference is generated between the respective regions, and thus heat of a temperature different from each other is conducted to the respective regions, so that temperature interference may occur between the respective regions.

That is, when regions are partitioned in a single container, a temperature of heat different from that of heat supplied to each of the regions is maintained by heat conducted along the container, so that heat of an appropriate cooking temperature may not be provided to food.

However, on the shelf of the cooking apparatus 1 according to an embodiment of the disclosure, containers to which heat of different temperatures is supplied are provided as separate configurations, so that temperature interference between the containers may be minimized.

The heat generating member 460 may also include the first heat generating member 461 and the second heat generating member 462 provided as separate configurations. The first and second heat generating members 461 and 462, which are provided to generate heat of different temperatures, are not provided as a single configuration, but are provided as separate configurations, so that temperature interference between the first heat generating member 461 and the second heat generating member 462 may be minimized.

As described above, the shelf 400 may include the holder 450 to support the first container 410 and the second container 420 arranged side by side in the second direction B.

The first container 410 and the second container 420 may be detachably coupled with respect to the holder 450. That is, as the first container 410 and the second container 420 are provided as separate configurations so that the shelf 400 may place a plurality of foods, the separate configurations may be detachably provided with respect to the holder 450.

Specifically, the first container 410 and the second container 420 may be detachably coupled in a third direction C with respect to the holder 450.

The holder 450 may include a frame 451 having a pair of the long sides 450L and a pair of the short sides 450S.

The frame 451 may be formed in a rectangular shape and may include a seating space 452 in which the first container 410 and the second container 420 may be seated.

The seating space 452 may be formed in a hollow shape inside the frame 451.

The first container 410 and the second container 420 may be seated in the third direction C in the seating space 452 of the frame 451.

The first container 410 and the second container 420 mounted on the frame 451 may be supported in a third direction C by the frame 451.

An insertion hole 453 may be formed on an inner surface of the frame 451 to allow a rim 412 of the first container 410 and a rim 422 of the second container 420 to be inserted. The insertion hole 453 may be formed along the inner surface of the frame 451.

The user may place the first container 410 and the second container 420 in the seating space 452 in the third direction C and insert the rim 412 of the first container 410 and the rim 422 of the second container 420 into the insertion hole 453 to fix the first container 410 and the second container 420 to the frame 451.

Accordingly, the first container 410 and the second container 420 may be fixed to the frame 451 and the shelf 400 may be integrally mounted in the cooking chamber 11 by the user.

However, the disclosure is not limited thereto, and the first container 410 and the second container 420 may be supported by the frame 451 in such a manner of not being inserted into the insertion hole 453 but of being placed on the upper portion 454 of the frame 451.

In addition, the manner in which the first container 410 and the second container 420 are supported on the frame 451 may be determined in various ways.

The user may easily separate the first container 410 and the second container 420 from the frame 45.

Accordingly, the first container 410 and the second container 420 may be easily cleaned after food placed on the shelf 400 is cooked.

As illustrated in FIG. 6, the first container 410 may be disposed on the left side of the cooking chamber 11 and the second container 420 may be disposed on the right side of the cooking chamber 1I based on the drawing, but the user may separate the first container 410 and the second container 420 and then couple the first container 410 and the second container 420 to the frame 451 so that the first container 410 is disposed on the right side of the cooking chamber 11 and the second container 420 is disposed on the left side of the cooking chamber 11 as illustrated in FIG.

Because the first and second containers 410 and 420 may be easily separated from the frame 451, the user may selectively position the first and second containers 410 and 420 on the left and right sides based on the cooking chamber 11.

The left and right sides described below are defined based on the second direction B, and when the first direction A is referred to as the front, the left side in the drawing corresponds to the left side of the cooking chamber 11 or the left side of the shelf 400, and the right side in the drawing corresponds to the right side of the cooking chamber 11 or the right side of the shelf 400.

As described above, a first heat generating member 461 is disposed on the first container 410 and a second heat generating member 462 is disposed on the second container 420, and the first heat generating member 461 and the second heat generating member 462 each have a predetermined heat generating temperature.

Accordingly, when the first container 410 and the second container 420 are provided to be fixed without being separated from the frame 451, the first container 410 is always disposed on the left side of the cooking chamber 11, and the second container 420 is always disposed on the right side of the cooking chamber 11.

In this case, as the first heat generating member 461 is provided to generate heat of a higher temperature than the second heat generating member 462, food to be cooked with heat of a high temperature needs to be always placed on the left side of the shelf 400 instead of on the right side.

However, as the shelf 400 according to an embodiment of the disclosure is configured such that the first and second containers 410 and 420 may be easily separated and may be selectively disposed on the left and right sides, the first container 410 may be disposed on the right side of the shelf 400, and thus, even when food having a higher cooking temperature than food in the left side of the shelf 400 are disposed on the right side of the shelf 400, cooking may proceed effectively.

That is, the first and second containers 410 and 420 of the shelf 400 may be arranged according to the user's preference, and thus, a plurality of foods having different cooking temperatures may be selectively placed on the left and right sides of the shelf 400.

In this case, in the third direction C, the second container 420 may be disposed to correspond to the first and third heaters 210 and 230, and the first container 410 may be disposed to correspond to the second and fourth heaters 220 and 240.

When the first and second containers 410 and 420 are disposed on the left and right sides contrary to the above description, the first and third heaters 210 and 230 may be provided to generate heat having a temperature corresponding to a temperature of heat generated from the second heat generating member 462 of the second container 420, and the second and fourth heaters 220 and 240 may be provided to generate heat having a temperature corresponding to a temperature of heat generated from the first heat generating member 461 of the first container 410.

The user may control a temperature of heat supplied from the second and fourth heaters 220 and 240 and a temperature of heat supplied from the first and third heaters 210 and 230 through the input 21 (see FIG. 1). The controller (not shown) receiving a signal from the input 21 may control a temperature of heat generated from the second and fourth heaters 220 and 240 and a temperature of heat generated from the first and third heaters 210 and 230.

The disclosure is not limited thereto, and when the first and second containers 410 and 420 are fixed to the left and right sides of the frame 451 in reverse and disposed inside the cooking chamber 11, a sensor (not shown) recognizing this arrangement is provided inside the cooking chamber 11 and a value sensed by the sensor (not shown) is transmitted to the controller (not shown), so that the controller (not shown) may control the temperatures of heat generated from the first and third heaters 210 and 230 and the second and fourth heaters 220 and 240.

The shelf 400 may further include a third container 430. That is, FIGS. 1 to 7 illustrate only an embodiment in which the first container 410 and the second container 420 are supported on the frame 451, but as illustrated in FIG. 8, the third container 430 is provided on the frame 45.

As described above, by the first heat generating member 461 and the second heat generating member 462 attached to the first container 410 and the second container 420, respectively, only heat of the temperatures T1 and T2 generated from the first heat generating member 461 and the second heat generating member 462 may be supplied to the first container 410 and the second container 420, respectively (see FIG. 5). Also, in the first and third heaters 210 and 230 corresponding to the first container 410 and the second and fourth heaters 220 and 240 corresponding to the second container 420 in the third direction C, heat of the temperatures T1 and T2 corresponding to heat of the temperatures T1 and T2 generated from the first heat generating member 461 and the second heat generating member 462, respectively may be supplied to the first container 410 and the second container 420, respectively.

Accordingly, assuming that the temperature T1 of beat generated from the first heat generating member 461 is about 200 degrees and the temperature T2 of heat generated from the second heat generating member 462 is about 120 degrees, even when a food having an appropriate cooking temperature of 150 degrees is placed on the first cooking surface 411 or the second cooking surface 421 and the cooking apparatus 1 is operated, cooking performance for the food may be degraded.

That is, because the temperatures of heat generated from the first and second heat generating members 461 and 462 are constant while appropriate cooking temperatures of foods are various, cooking performance for some foods may degraded.

For this reason, the shelf 400 may include a plurality of the containers 410, 420, and 430 capable of being supported on the frame 451 so that various foods are appropriately cooked.

A third heat generating member (not shown) of the third container 430 may be provided to generate heat of a temperature different from that of heat generated from the first heat generating member 461 and the second heat generating member 462.

For example, assuming that the temperature generated from the third heat generating member (not shown) is 150 degrees, when appropriate cooking temperatures of a plurality of foods to be cooked are 200 degrees and 150 degrees, the user may fix the first container 410 and the third container 430 to the frame 451, place the respective foods on the first container 410 and the third container 430, and operate the cooking apparatus 1.

In this case, the second and fourth heaters 220 and 240 disposed to correspond to the third container 430 in the third direction C may transfer heat of a temperature corresponding to the temperature of heat generated from the third heat generating member (not shown) of the third container 430 to the third container 430.

That is, the user may control the temperature of heat supplied from the second and fourth heaters 220 and 240 through the input 21 (see FIG. 1). The controller (not shown) receiving a signal from the input 21 may control the temperature of heat generated from the second and fourth heaters 220 and 240.

The disclosure is not limited thereto, and when the third container 430 is fixed to the frame 451 and disposed inside the cooking chamber 11, a sensor (not shown) recognizing this arrangement is provided inside the cooking chamber 11 and a value sensed by the sensor (not shown) is transmitted to the controller (not shown), so that the controller (not shown) may control the temperatures of heat generated from the second and fourth heaters 220 and 240.

That is, in accordance with an appropriate cooking temperature of food, the user may fix a container, to which the heat generating member 460 that generates heat of a temperature corresponding to or most similar to the appropriate cooking temperature of the food among the plurality of containers 410, 420, and 430 is coupled, to the frame 451 and operate the cooking apparatus 1.

Unlike an embodiment of the disclosure, the plurality of containers 410, 420, and 430 may be configured to include four or more containers. The heat generating members 460 coupled to the respective containers are all provided to generate heat of different heat temperatures, so that the user may select a container according to an appropriate cooking temperature of food and fix the container to the frame 451 to proceed with cooking.

Also, as illustrated in FIG. 9, cooking may be performed by fixing only one of the plurality of containers 410 and 420 to the frame 451.

As described above, a plurality of foods may be placed on the shelf 400 by the plurality of containers 410 and 420 fixed to the frame 451 and may be cooked simultaneously, but when a single food is to be cooked, without all of the plurality of containers 410 and 420 being fixed to the frame 451, only one of the plurality of containers 410 and 420 may be fixed to the frame 451 so that cooking may proceed.

Hereinafter, a cooking apparatus according to another embodiment of the disclosure will be described. Except for a shelf 500 and the first heating source 200, configurations of a cooking apparatus to be described below are the same as those of the cooking apparatus 1 according to the above-described embodiment, and thus a duplicate description will be omitted.

Figure 10:
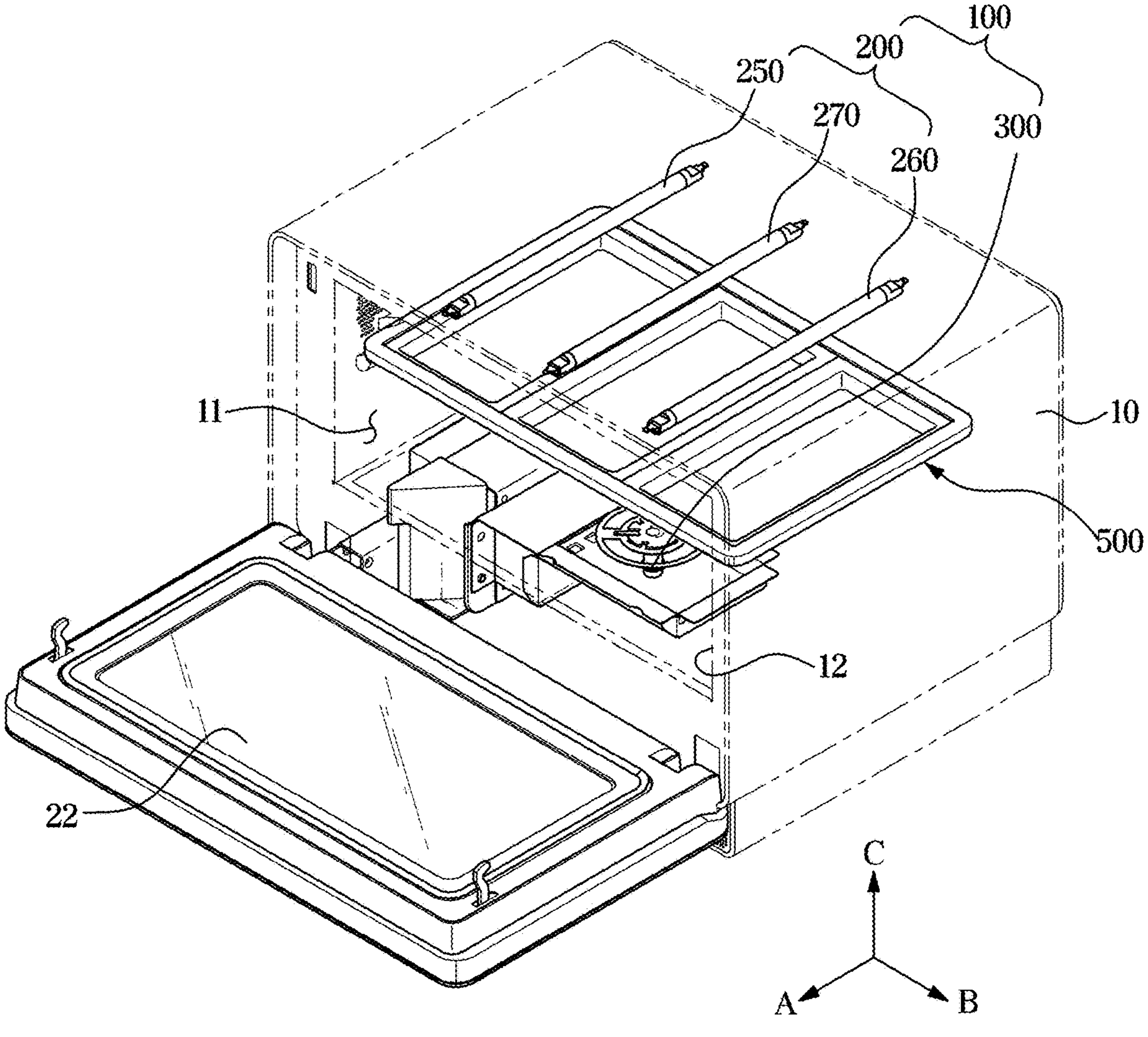
FIG. 10 illustrates some of components inside a cooking apparatus according to another embodiment of the disclosure.
Figure 11:
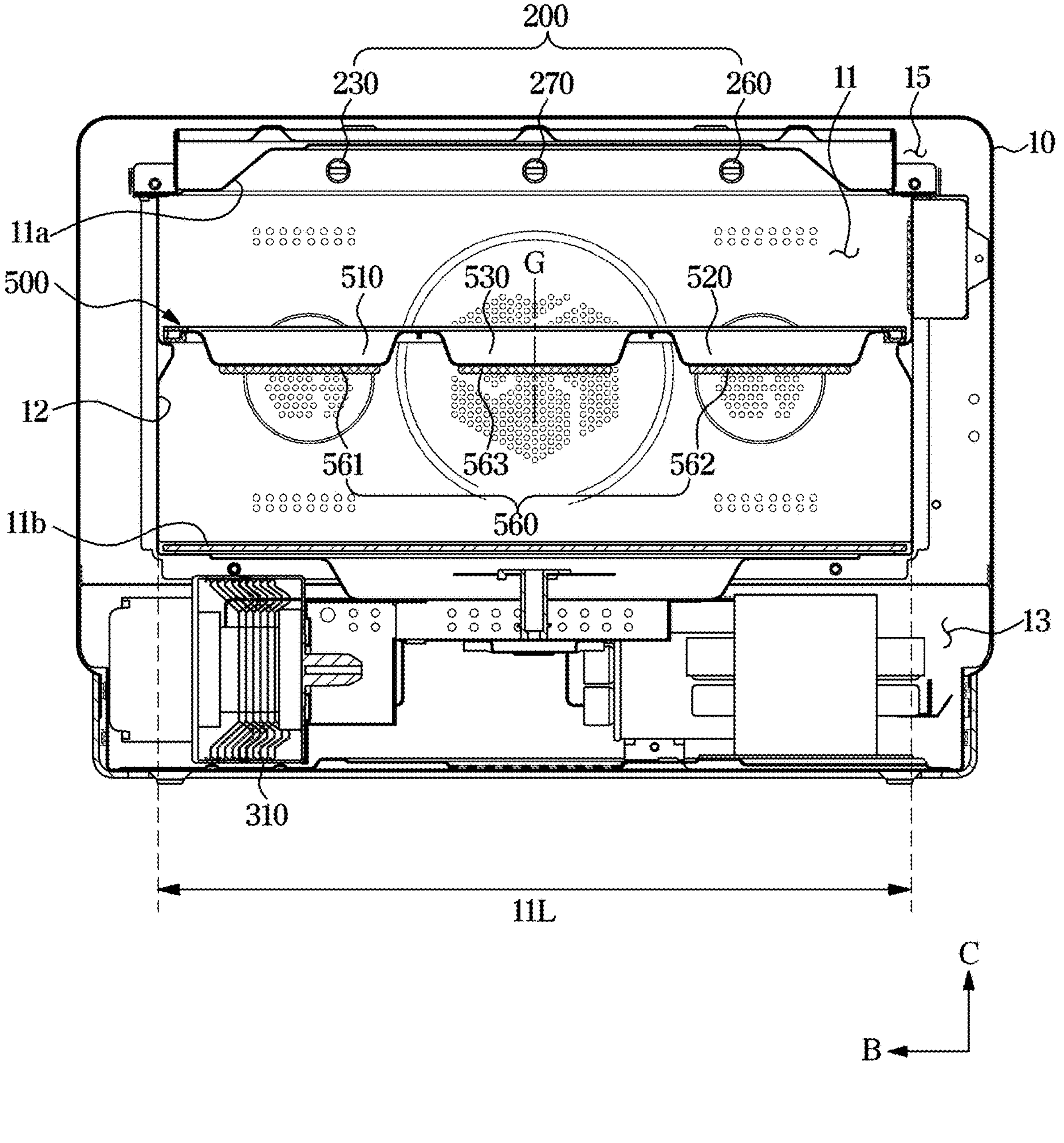
FIG. 11 is a cross-sectional view of the cooking apparatus according to another embodiment of the disclosure.
Figure 12:
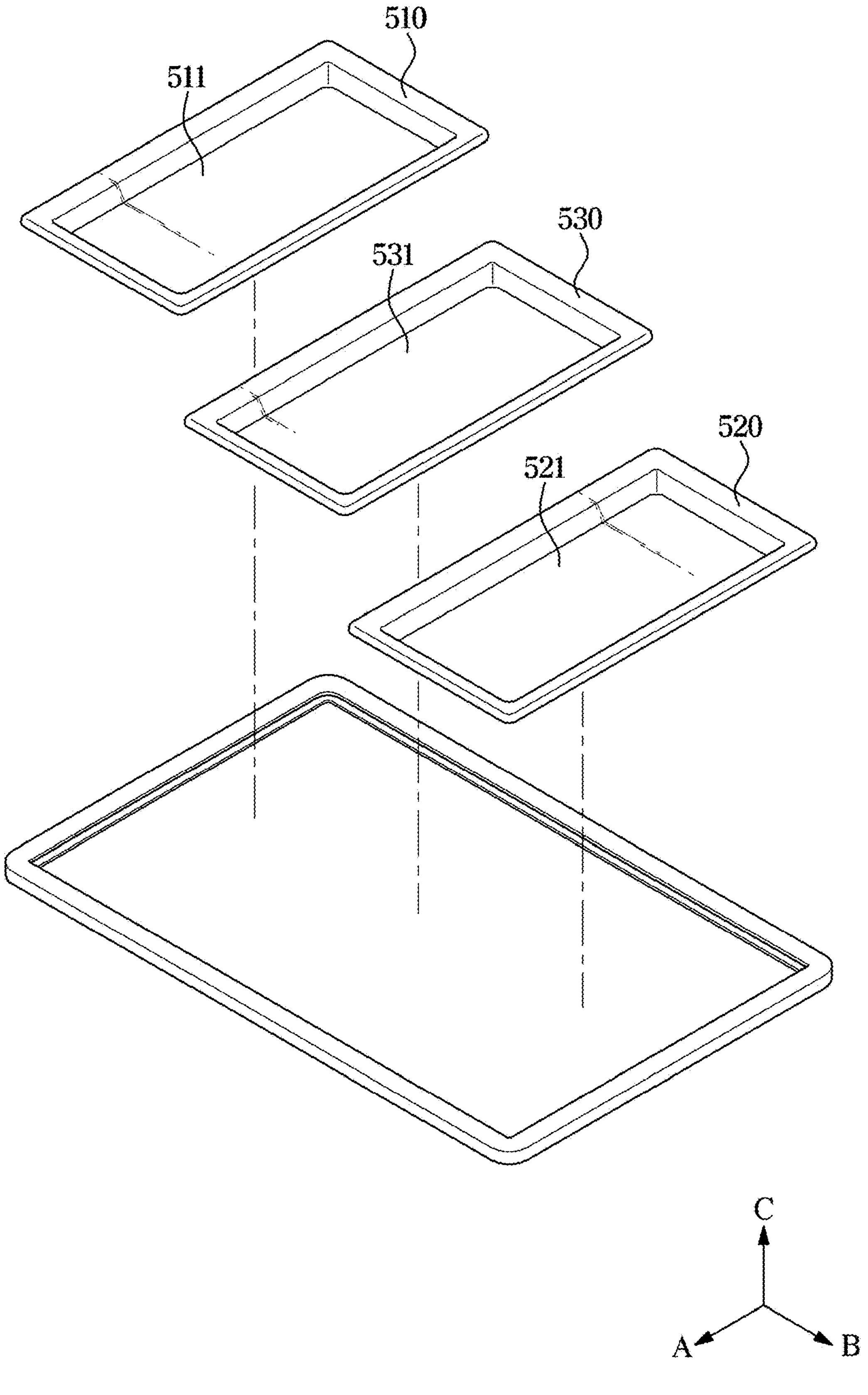
FIG. 12 illustrates a state in which a plurality of containers of a shelf is separated according to another embodiment of the disclosure.

FIG. 10 illustrates some of components inside a cooking apparatus according to another embodiment of the disclosure, FIG. 11 is a cross-sectional view of the cooking apparatus according to another embodiment of the disclosure, and FIG. 12 illustrates a state in which a plurality of containers of a shelf is separated according to another embodiment of the disclosure.

As illustrated in FIGS. 10 to 12, the first heating source 200 may include three heaters 250, 260, and 270. The three heaters 250, 260, and 270 may be disposed to be spaced apart from each other in the second direction B. The three heaters 250, 260, and 270 are not limited thereto, and each of the heaters 250, 260, and 270 may be formed as a pair, respectively, so that six heaters may be provided.

Based on the center line G of the shelf 500 in the second direction B, the first heater 250 may be disposed on one side of the center line G. The second heater 260 may be disposed on the opposite side based on the center line G. The third heater 270 may be disposed adjacent to the center line G.

The first heater 250, the second heater 260, and the third heater 270 may each generate heat of different temperatures. That is, based on the center line G, a temperature generated at one side of the center line G, a temperature generated at the opposite side, and a temperature generated at the center line G may be different from each other.

The shelf 500 may include a first container 510, a second container 520, and a third container 530 that may be simultaneously supported on a frame 551. The first, second and third containers 510, 520, and 530 may be arranged in the second direction B. Based on the center line G of the shelf 500, the first container 510 may be disposed on one side of the center line G, the third container 530 may be disposed on the center line G, and the second container 520 may be disposed on the opposite side of the center line G.

Accordingly, a first cooking surface 511 of the first container 510 may be disposed at a position corresponding to the first heater 250 in the third direction C. A second cooking surface 521 of the second container 520 may be disposed at a position corresponding to the second heater 260 in the third direction C. A third cooking surface 531 of the third container 530 may be disposed at a position corresponding to the third heater 270 in the third direction C.

As described above, because the temperatures of heat generated from the first heater 250, the second heater 260, and the third heater 270 are different, temperatures of heat transferred to an upper side of the first cooking surface 511, an upper side of the second cooking surface 521, and an upper side of the third cooking surface 531 may be different.

The heat generating member 560 may be provided in a number corresponding to the number of the first, second, and third containers 510, 520, and 530. The heat generating member 560 may include a first heat generating member 561 coupled to the first container 510, a second heat generating member 562 coupled to the second container 520, and a third heat generating member 563 coupled to the third container 530.

The heat generating members 561, 562, and 563 may be disposed at lower sides of the cooking surfaces 511, 521, and 531 in the third direction C, respectively. The heat generating member 560 may generate heat by absorbing a high frequency oscillated from the magnetron 310.

The heat generating members 561, 562, and 563 may be configured to absorb a high frequency and generate heat of different temperatures.

The heat generating members 561, 562, and 563 may be configured to have different ferrite contents. Accordingly, even when the same high frequency is transferred, the heat generating members 561, 562, and 563 may each generate heat of different temperatures.

The first heat generating member 561 may be disposed at a position corresponding to the first cooking surface 511 in the third direction C. The second heat generating member 562 may be disposed at a position corresponding to the second cooking surface 521 in the third direction C. The third heat generating member 563 may be disposed at a position corresponding to the third cooking surface 531 in the third direction C.

Accordingly, temperatures of heat transferred to the lower side of the first cooking surface 511, the lower side of the second cooking surface 521, and the lower side of the third cooking surface 531 may be different.

The temperature of heat generated from the first heater 250 and the temperature of heat generated from the first heat generating member 561 may substantially correspond to each other. The temperature of heat generated from the second heater 260 and the temperature of heat generated from the second heat generating member 562 may substantially correspond to each other. The temperature of heat generated from the third heater 270 and the temperature of heat generated from the third heat generating member 563 may substantially correspond to each other.

Accordingly, heat of substantially the same temperature may be provided in the upward and downward directions of the first cooking surface 511, heat of substantially the same temperature may be provided in the upward and downward directions of the second cooking surface 521, and heat of substantially the same temperature may be provided in the upward and downward directions of the third cooking surface 531.

The first, second, and third containers 510, 520, and 530 may be disposed to be detachable from the frame 551. Accordingly, the user may arrange the first, second, and third containers 510, 520, and 530 in the second direction B with many numbers of cases. Therefore, as in the above-described embodiment, the temperatures of heat generated from the first, second, and third heaters 250, 260, and 270 may also be variously controlled according to the type of the containers 510, 520, and 530 disposed at positions corresponding thereto in the third direction C.

Therefore, in the cooking apparatus 1 according to another embodiment of the disclosure, three foods having different cooking temperatures may be cooked simultaneously in the cooking chamber 11.

Hereinafter, a cooking apparatus according to another embodiment of the disclosure will be described. Except for a shelf 600 and the first heating source 200, configurations of a cooking apparatus to be described below are the same as those of the cooking apparatus 1 according to the above-described embodiment, and thus a duplicate description will be omitted.

Figure 13:
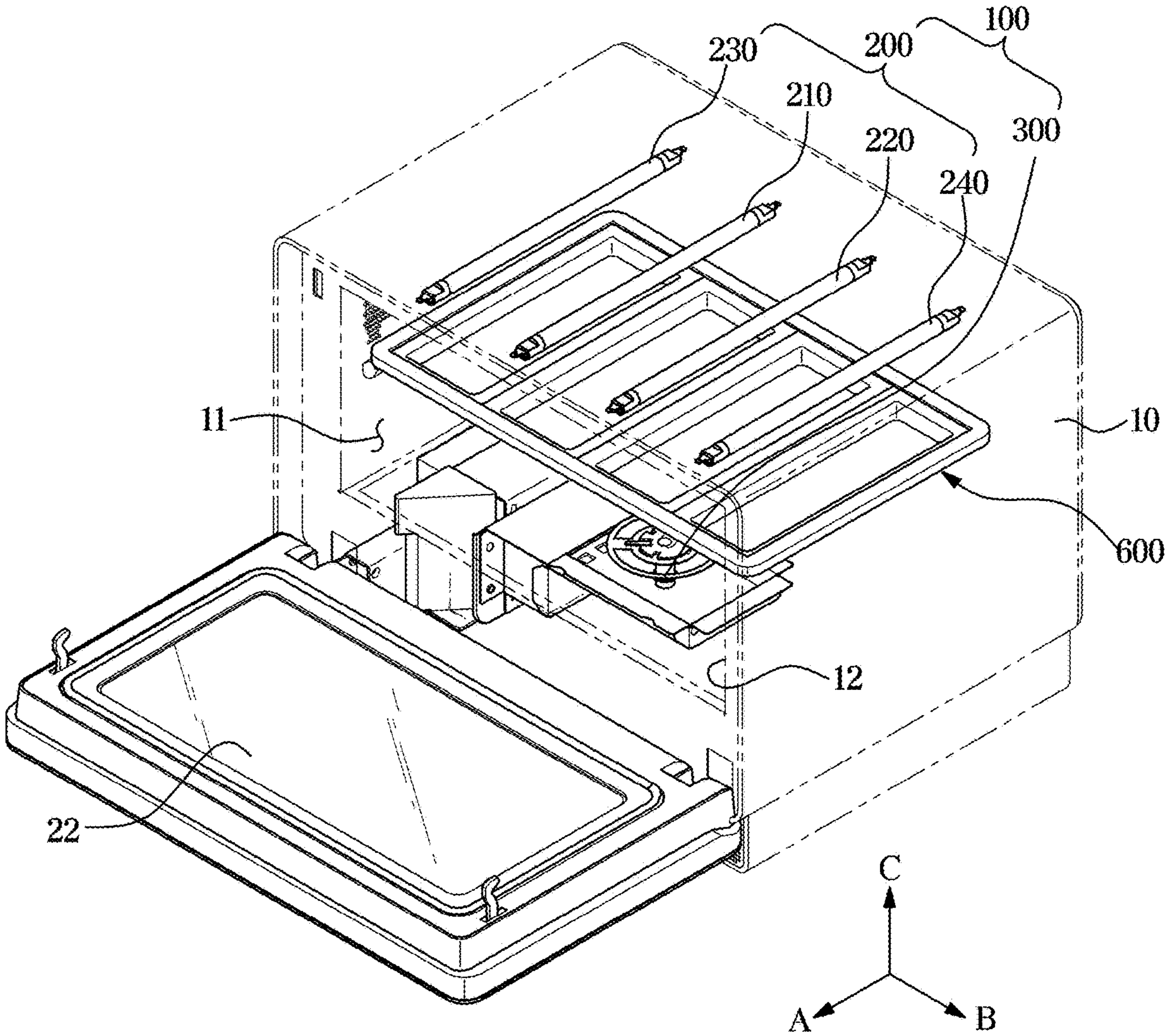
FIG. 13 illustrates some of components inside a cooking apparatus according to another embodiment of the disclosure.
Figure 14:
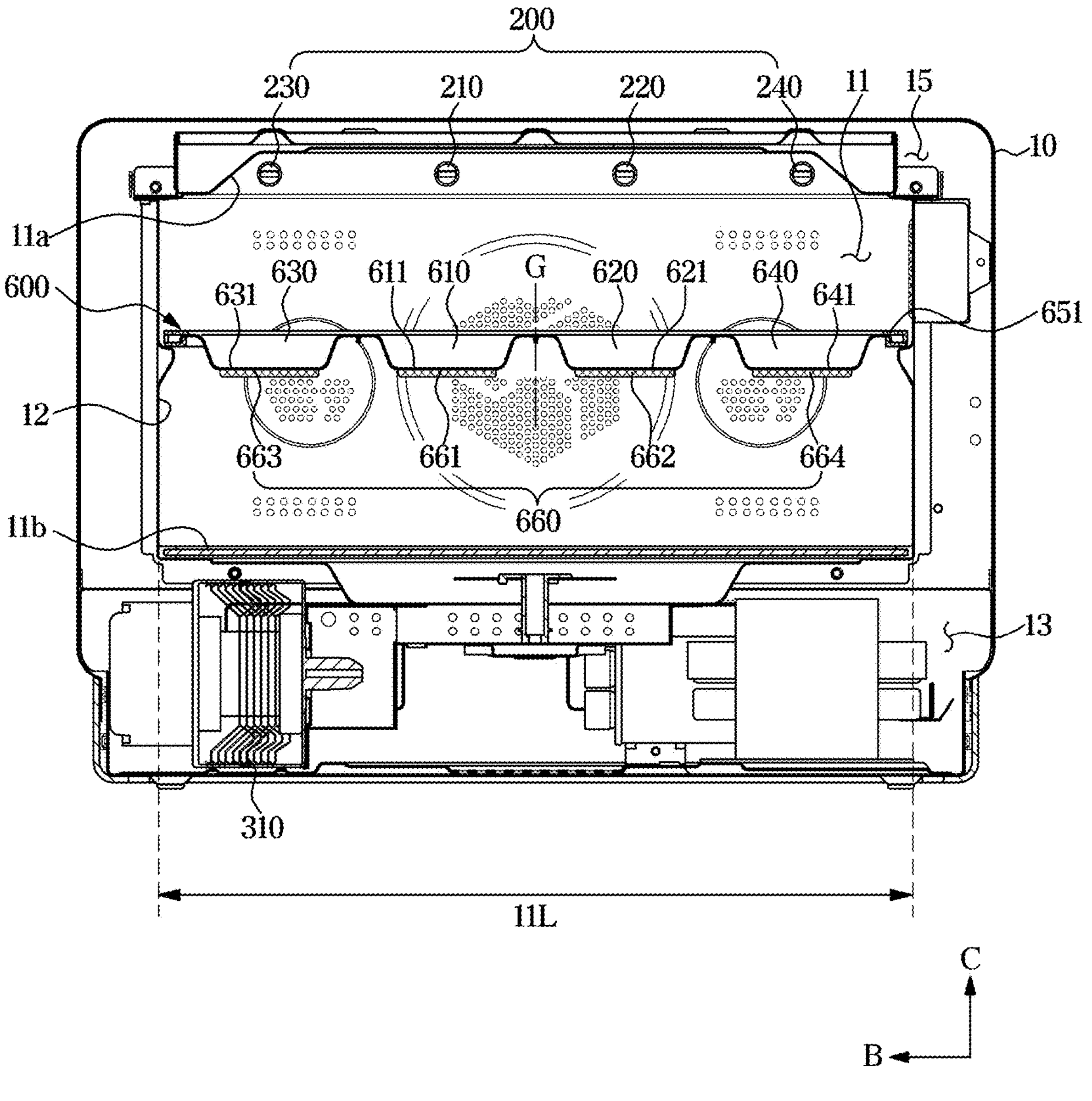
FIG. 14 is a cross-sectional view of the cooking apparatus according to another embodiment of the disclosure.

FIG. 13 illustrates some of components inside a cooking apparatus according to another embodiment of the disclosure, and FIG. 14 is a cross-sectional view of the cooking apparatus according to another embodiment of the disclosure.

As illustrated in FIGS. 13 and 14, the first heating source 200 may include the four heaters 210, 220, 230 and 240. The four heaters 210, 220, 230 and 240 may be disposed to be spaced apart from each other in the second direction B. The four heaters 210, 220, 230 and 240 are not limited thereto, and each of the heaters 210, 220, 230 and 240 may be formed as a pair, respectively, so that eight heaters may be provided.

Unlike the plurality of heaters 210, 220, 230, and 240 of the above-described embodiment of the disclosure, the four heaters 210, 220, 230, and 240 may each generate heat of different temperatures.

Based on the center line G of the shelf 500 in the second direction B, the first heater 210 may be disposed on one side of the center line G. The second heater 220 may be disposed on the opposite side based on the center line G. The third heater 230 may be disposed on one side of the center line G like the first heater 210 based on the center line G. The fourth heater 240 may be disposed on the other side of the center line G like the second heater 220 based on the center line G.

As described above, the first heater 210, the second heater 220, the third heater 230, and the fourth heater 240 may generate heat of different temperatures. That is, the plurality of heaters 210, 220, 230, and 240 may each generate heat of different temperatures in the third direction C to which heat is transferred.

The shelf 600 may include a first container 610, a second container 620, a third container 630, and a fourth container 640 that may be simultaneously supported on a frame 651. The first, second, third, and fourth containers 610, 620, 630, and 640 may be arranged in the second direction B. Based on the center line G of the shelf 600, the first container 610 and the third container 630 may be disposed on one side of the center line G, and the second container 620 and the fourth container 640 may be disposed on the opposite side of the center line G3.

A first cooking surface 611 of the first container 610 may be disposed at a position corresponding to the first heater 210 in the third direction C. A second cooking surface 621 of the second container 620 may be disposed at a position corresponding to the second heater 220 in the third direction C A third cooking surface 631 of the third container 630 may be disposed at a position corresponding to the third heater 230 in the third direction C. A fourth cooking surface 641 of the fourth container 640 may be disposed at a position corresponding to the fourth heater 240 in the third direction C.

As described above, because the temperatures of heat generated from the first heater 210, the second heater 220, the third heater 230, and the fourth heater 240 are different, temperatures of heat transferred to an upper side of the first cooking surface 611, an upper side of the second cooking surface 621, an upper side of the third cooking surface 631, and an upper side of the fourth cooking surface 641 may be different.

The heat generating member 660 may be provided in a number corresponding to the number of the first, second, third, and fourth containers 610, 620, 630, and 640. The heat generating member 660 may include a first heat generating member 661 coupled to the first container 610, a second heat generating member 662 coupled to the second container 620, a third heat generating member 663 coupled to the third container 630, and a fourth heat generating member 664 coupled to the fourth container 640.

The heat generating members 661, 662, 663, and 664 may be disposed at lower sides of the cooking surfaces 611, 621, 631, and 641 in the third direction C, respectively. The heat generating member 660 may generate heat by absorbing a high frequency oscillated from the magnetron 310.

The heat generating members 661, 662, 663, and 664 may be configured to absorb a high frequency and generate heat of different temperatures.

The heat generating members 661, 662, 663, and 664 may be configured to have different ferrite contents. Accordingly, even when the same high frequency is transferred, the heat generating members 661, 662, 663, and 664 may each generate heat of different temperatures.

The first heat generating member 661 may be disposed at a position corresponding to the first cooking surface 611 in the third direction C. The second heat generating member 662 may be disposed at a position corresponding to the second cooking surface 621 in the third direction C. The third heat generating member 663 may be disposed at a position corresponding to the third cooking surface 631 in the third direction C. The fourth heat generating member 664 may be disposed at a position corresponding to the fourth cooking surface 641 in the third direction C.

Accordingly, temperatures of heat transferred to the lower side of the first cooking surface 611, the lower side of the second cooking surface 621, the lower side of the third cooking surface 631, and the lower side of the fourth cooking surface 641 may be different.

The temperature of heat generated from the first heater 210 and the temperature of heat generated from the first heat generating member 661 may substantially correspond to each other. The temperature of heat generated from the second heater 220 and the temperature of heat generated from the second heat generating member 662 may substantially correspond to each other. The temperature of heat generated from the third heater 230 and the temperature of heat generated from the third heat generating member 663 may substantially correspond to each other. The temperature of heat generated from the fourth heater 240 and the temperature of heat generated from the fourth heat generating member 664 may substantially correspond to each other.

Accordingly, heat of substantially the same temperature may be provided in the upward and downward directions of the first cooking surface 611, heat of substantially the same temperature may be provided in the upward and downward directions of the second cooking surface 621, heat of substantially the same temperature may be provided in the upward and downward directions of the third cooking surface 631, and heat of substantially the same temperature may be provided in the upward and downward directions of the fourth cooking surface 641.

The first, second, third, and fourth containers 610, 620, 630, and 640 may be disposed to be detachable from the frame 651. Accordingly, the user may arrange the first, second, third, and fourth containers 610, 620, 630, and 640 in the second direction B with many numbers of cases. Therefore, as in the above-described embodiment, the temperatures of heat generated from the first, second, third, and fourth heaters 210, 220, 230, and 240 may also be variously controlled according to the type of the containers 610, 620, 630, and 640 disposed at positions corresponding thereto in the third direction C.

Therefore, in the cooking apparatus 1 according to another embodiment of the disclosure, four foods having different cooking temperatures may be cooked simultaneously in the cooking chamber 11.

Hereinafter, a cooking apparatus according to another embodiment of the disclosure will be described. Except for a first heating source 200', configurations of a cooking apparatus to be described below are the same as those of the cooking apparatus 1 according to the above-described embodiment, and thus a duplicate description will be omitted.

Figure 15:
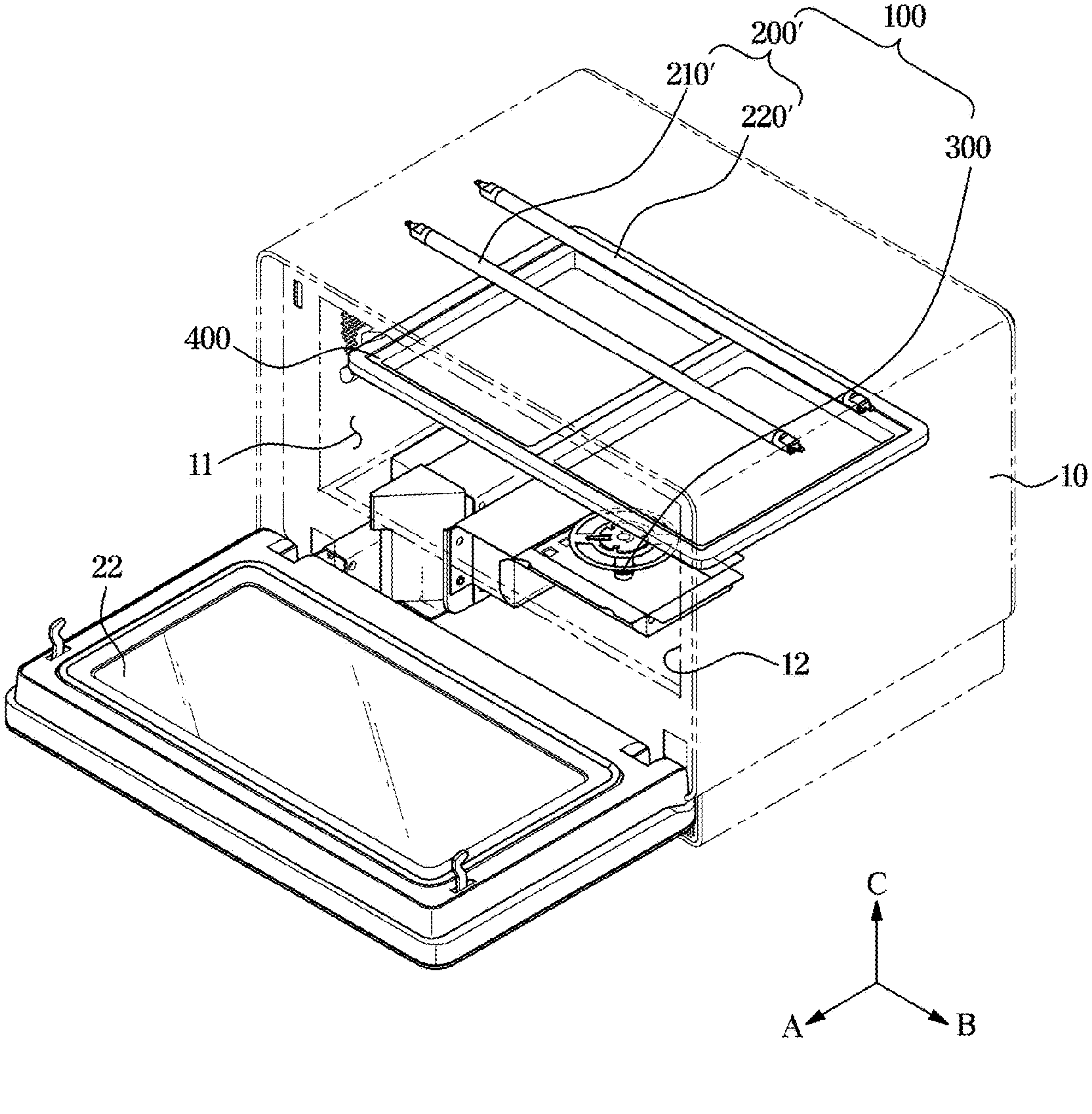
FIG. 15 illustrates some of components inside a cooking apparatus according to another embodiment of the disclosure.
Figure 16:
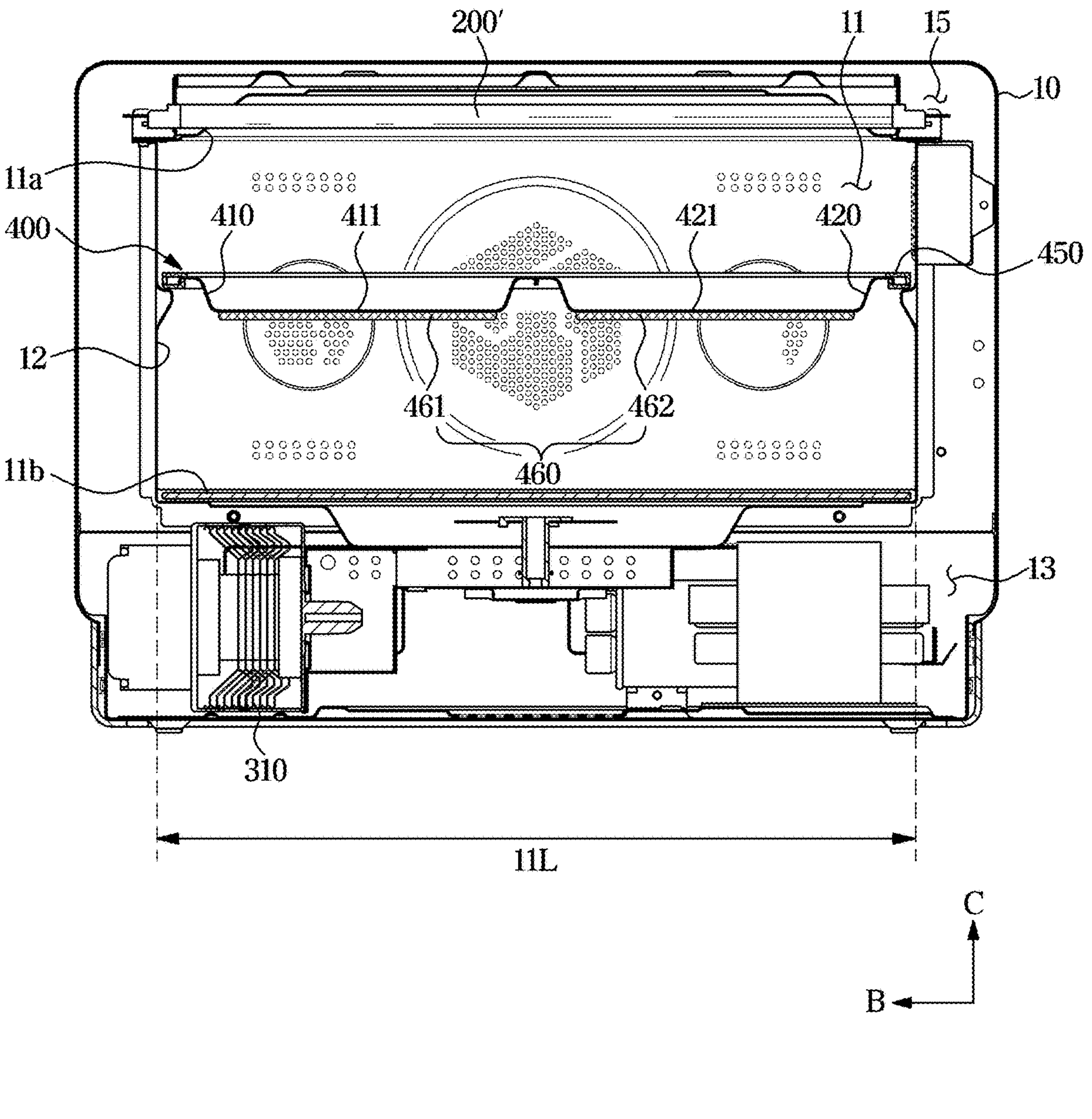
FIG. 16 is a cross-sectional view of the cooking apparatus according to another embodiment of the disclosure.

FIG. 15 illustrates some of components inside a cooking apparatus according to another embodiment of the disclosure, and FIG. 16 is a cross-sectional view of the cooking apparatus according to another embodiment of the disclosure.

Unlike the first heating source 200 according to an embodiment of the disclosure, the first heating source 200' according to another embodiment of the disclosure may include a plurality of heaters 210' and 220' having long axes extending in a direction corresponding to the second direction B.

As the plurality of heaters 210' and 220' extend along the second direction B, heat of the same temperature may be transferred to the first container 410 and the second container 420. Specifically, heat of the same temperature may be transferred to the upper side of the first cooking surface 411 of the first container 410 and the upper side of the second cooking surface 421 of the second container 420.

The first heat generating member 461 may be disposed at the lower side of the first cooking surface 411, and the second heat generating member 462 may be disposed at the lower side of the second cooking surface 421. Accordingly, heat of different temperatures may be transferred to the lower side of the first cooking surface 411 and the lower side of the second cooking surface 421.

Therefore, even when heat of the same temperature is transferred from the upper sides of the first cooking surface 411 and the second cooking surface 421, heat of different temperatures is transferred from the lower sides of the first cooking surface 411 and the second cooking surface 421, and thus foods having different cooking temperatures may be cooked on the first cooking surface 411 and the second cooking surface 421.

Hereinafter, a cooking apparatus according to another embodiment of the disclosure will be described. Except for a heating source 100', configurations of a cooking apparatus to be described below are the same as those of the cooking apparatus 1 according to the above-described embodiment, and thus a duplicate description will be omitted.

Unlike the cooking apparatus 1 of the above-described embodiments, a cooking apparatus 1' according to another exemplary embodiment of the disclosure below will be described with a general microwave oven as an example.

Figure 17:
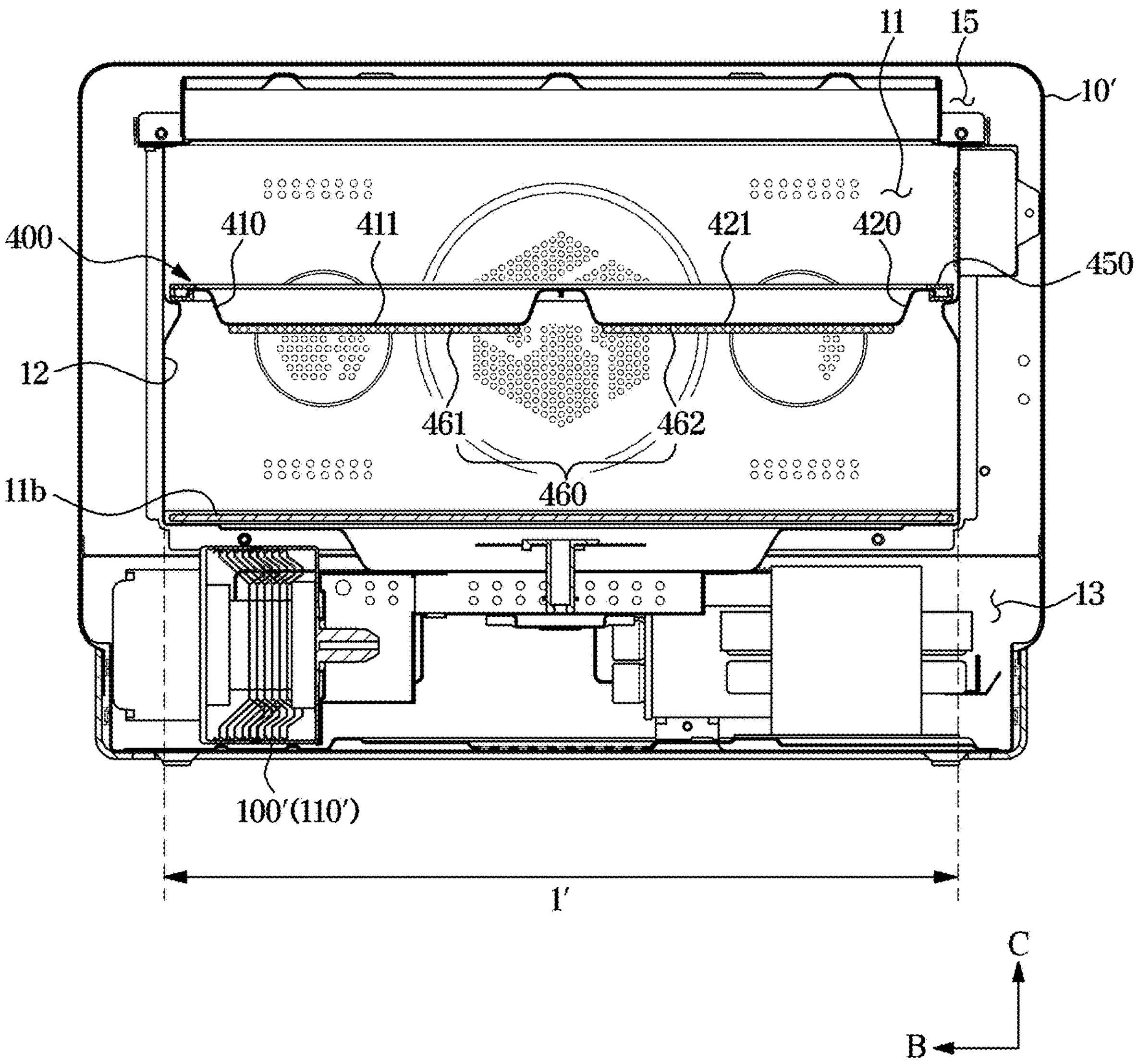
FIG. 17 is a cross-sectional view of a cooking apparatus according to another embodiment of the disclosure.

FIG. 17 is a cross-sectional view of a cooking apparatus according to another embodiment of the disclosure.

The cooking apparatus 1' may include a housing 10' forming an outer appearance and the cooking chamber 11 formed inside the housing 10'. The heating source 100' may be disposed on the lower surface 11*a* of the cooking chamber 11.

The heating source 100 may include a magnetron 110' generating a high frequency. The high frequency generated from the magnetron 110' may be injected into food so that the inside of the food is cooked by frictional heat between molecules generated by repeatedly converting the molecular arrangement of moisture contained in the food.

The magnetron 110' may be disposed in the machine room 13. As the magnetron 110' oscillates a high frequency from the machine room 13 toward the lower surface 11*b* of the cooking chamber 11, the high frequency may pass through the lower surface 11*b* and be irradiated to the shelf 400.

The high frequency oscillated from the magnetron 110' may be absorbed by the heat generating part or reflected by the cooking chamber 11 or shelf 400 to be directly introduced into the food placed on the cooking surface 421.

The first heat generating member 461 may be disposed at the lower side of the first cooking surface 411 of the first container 410, and the second heat generating member 462 may be disposed at the lower side of the second cooking surface 421 of the second container 420. Accordingly, heat of different temperatures may be transferred to the lower side of the first cooking surface 411 and the lower side of the second cooking surface 421.

Accordingly, even when the same high frequency is directly introduced into the first cooking surface 461 and the second cooking surface 462, heat of different temperatures is transferred from the lower sides of the first cooking surface 411 and the second cooking surface 421, and thus foods having different cooking temperatures may be cooked on the first cooking surface 411 and the second cooking surface 421.

As is apparent from the above, in a cooking apparatus according to the disclosure, a plurality of containers on which food is placed are provided on a shelf, and a heat generating part for providing heat to each of the plurality of containers is provided, a plurality of cooking spaces for providing different temperatures inside a cooking chamber can be efficiently partitioned by the plurality of heat generating parts generating heat of different temperatures. Therefore, two or more foods having different cooking temperatures can be easily cooked simultaneously in a plurality of divided cooking spaces, respectively.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking apparatus comprising:

a cooking chamber in which food is cooked and being open in a first direction and comprising support arts formed on opposite sides of the cooking chamber;

a shelf configured to be inserted into the cooking chamber in the first direction and comprising a container in which food is placed and a holder configured to support the container; and a magnetron configured to generate a high frequency to be supplied to the shelf, wherein the shelf comprises a heat generating member to generate heat by the high frequency generated from the magnetron, the container comprises a first container disposed on one side in a second direction orthogonal to the first direction, and a second container disposed on another side in the second direction, the first container having a first cooking surface on which food is placed in the first container in a third direction orthogonal to the first and second directions, and the second container having a second cooking surface on which food is placed in the second container in the third direction, and the heat generating member comprises a first heat generating member disposed on the first container on an opposite side of the first cooking surface on which food is placed to provide heat to the first container, and a second heat generating member disposed on the second container on an opposite side of the second cooking surface on which food is placed to provide heat to the second container, wherein the first heat generating member is formed of a first material composition to provide heat of a first temperature when absorbing the high frequency, and the second heat generating member is formed of a second material composition to provide heat of a second temperature when absorbing the high frequency, and wherein the heat generating member comprises a ferrite material, and a content of the ferrite material in the first heat generating member and a content of the ferrite material in the second heat generating member are different, and wherein the holder is mountable on the support parts and the first container and the second container are provided to be detachable with respect to the holder.

2. The cooking apparatus according to claim 1, wherein the first heat generating member is configured to supply an amount of heat larger than an amount of heat supplied to the second container by the second heat generating member to the first container.

3. The cooking apparatus according to claim 1, wherein the holder of the shelf comprises a frame having a long side extending in the second direction and a short side extending in the first direction, and a seating space formed inside the frame so that the first container or the second container is seated.

4. The cooking apparatus according to claim 1, wherein the content of the ferrite material in the first heat generating member is larger than the content of the ferrite material in the second heat generating member.

5. The cooking apparatus according to claim 1, wherein the magnetron is disposed below the cooking chamber in the third direction to face the first and second heat generating members.

6. The cooking apparatus according to claim 1, wherein the first container and the second container are configured to be detachably seated in a third direction orthogonal to the first and second directions, respectively.

7. The cooking apparatus according to claim 6, wherein the holder is configured to support the first container and the second container in the third direction.

8. The cooking apparatus according to claim 3, wherein:

the holder further comprises an insertion hole formed along an inner surface of the frame forming the seating space to allow rims of the first and second containers to be inserted, and the first and second containers inserted into the insertion hole are configured to be supported by the holder in a third direction orthogonal to the first and second directions.

9. The cooking apparatus according to claim 5, further comprising:

a heater disposed inside the cooking chamber opposite to the magnetron to provide heat to the first and second cooking surfaces.

10. The cooking apparatus according to claim 9, wherein the heater comprises a first heater disposed to correspond to the first container in the third direction orthogonal to the first and second directions, and a second heater disposed to correspond to the second container in the third direction.

11. The cooking apparatus according to claim 10, wherein the first and second heaters have long axes extending in a direction corresponding to the first direction and are disposed to be spaced apart from each other in the second direction.

12. The cooking apparatus according to claim 1, wherein:

the container further comprises a third container disposed between the first container and the second container in the second direction, the heat generating member further comprises a third heat generating member configured to provide heat to the third container, and the third heat generating member is disposed on an opposite side of a third cooking surface on which food is placed in the third container in a third direction orthogonal to the first and second directions.

13. The cooking apparatus according to claim 12, wherein the third heat generating member is configured to supply heat of a temperature, which is different from those of heat supplied to the first and second containers from the first and second heat generating members, to the third container.

14. A cooking apparatus comprising:

a cooking chamber in which food is cooked and being open in a first direction and comprising support parts formed on opposite sides of the cooking chamber;

a shelf configured to be inserted into the cooking chamber in the first direction and on which food is placed; and a magnetron configured to generate a high frequency to be supplied to the shelf, wherein the shelf comprises:

a holder having a long side extending in a second direction orthogonal to the first direction and a short side extending in the first direction;

a first container and a second container configured to be seated on the holder and in which food is placed, respectively, the first container having a first cooking surface on which food is placed in the first container in a third direction orthogonal to the first and second directions, and the second container having a second cooking surface on which food is placed in the second container in the third direction; and a first heat generating member on an opposite side of the first cooking surface on which food is placed and a second heat generating member on an opposite side of the second cooking surface on which food is placed configured to generate heat by the high frequency generated from the magnetron to transfer the heat to the first and second containers, respectively, wherein the first heat generating member is formed of a first material composition to provide heat of a first temperature when absorbing the high frequency, and the second heat generating member is formed of a second material composition to provide heat of a second temperature when absorbing the high frequency, and wherein the first heat generating member comprises a ferrite material, the second heat generating member comprises a ferrite material, and a content of the ferrite material in the first heat generating member and a content of the ferrite material in the second heat generating member are different, and wherein the holder is mountable on the support parts and the first container and the second container are configured to be disposed side by side in the second direction and to be detachably seated in a third direction orthogonal to the first and second directions with respect to the holder.

* * * * *